(12) United States Patent
Zhu

(10) Patent No.: US 11,038,760 B2
(45) Date of Patent: Jun. 15, 2021

(54) RESOURCE ADJUSTMENT METHOD, APPARATUS, AND SYSTEM

(71) Applicant: HUAWEI TECHNOLOGIES CO., LTD., Shenzhen (CN)

(72) Inventor: Ning Zhu, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/454,044

(22) Filed: Jun. 26, 2019

(65) Prior Publication Data

US 2019/0319845 A1 Oct. 17, 2019

Related U.S. Application Data

(63) Continuation of application No. PCT/CN2017/114220, filed on Dec. 1, 2017.

(30) Foreign Application Priority Data

Dec. 26, 2016 (CN) .......................... 201611220995.8

(51) Int. Cl.
*H04L 12/24* (2006.01)
*H04L 12/725* (2013.01)
*H04L 12/801* (2013.01)
*H04L 12/851* (2013.01)

(52) U.S. Cl.
CPC ...... *H04L 41/0893* (2013.01); *H04L 41/0896* (2013.01); *H04L 45/306* (2013.01); *H04L 47/12* (2013.01); *H04L 47/2425* (2013.01)

(58) Field of Classification Search
CPC ... H04L 47/822; H04L 41/0896; H04L 47/12; H04L 47/2425; H04L 45/306; H04L 41/0893; H04W 72/00
See application file for complete search history.

(56) References Cited

U.S. PATENT DOCUMENTS

| | | | |
|---|---|---|---|
| 10,356,169 B1* | 7/2019 | Mistry | ................ H04L 67/1095 |
| 10,445,339 B1* | 10/2019 | Mistry | .................... H04L 43/08 |
| 2005/0157641 A1 | 7/2005 | Roy | |

(Continued)

FOREIGN PATENT DOCUMENTS

| | | |
|---|---|---|
| CN | 101742554 A | 6/2010 |
| CN | 102571544 A | 7/2012 |

(Continued)

*Primary Examiner* — Brian D Nguyen
(74) *Attorney, Agent, or Firm* — Kilpatrick Townsend & Stockton LLP

(57) ABSTRACT

Embodiments provide resource adjustment method, apparatus, and system. Under the method characteristic information of a service flow can be received by a communications network. A transmission path of the service flow can be determined based on a correspondence between the characteristic information of the service flow and the transmission path of the service flow. The transmission path includes a start network function NF and an end NF through which the service flow passes, and a link between the start NF and the end NF. A resource adjustment policy can then be determined for the transmission path to adjust a resource required by the service flow. With this, statuses of all network resources used for performing a service are considered during resource adjustment.

20 Claims, 11 Drawing Sheets

(56) References Cited

U.S. PATENT DOCUMENTS

| | | | |
|---|---|---|---|
| 2015/0222640 A1 | 8/2015 | Kumar et al. | |
| 2015/0326478 A1 | 11/2015 | Janakiraman et al. | |
| 2015/0365324 A1 | 12/2015 | Kumar et al. | |
| 2017/0141944 A1* | 5/2017 | Lee | H04L 67/10 |
| 2017/0214634 A1* | 7/2017 | Li | H04L 67/1008 |
| 2017/0222889 A1* | 8/2017 | Zong | H04L 41/5051 |
| 2018/0013656 A1* | 1/2018 | Chen | H04W 24/04 |
| 2018/0077020 A1 | 3/2018 | Li et al. | |
| 2018/0152381 A1 | 5/2018 | Liu | |
| 2018/0176886 A1* | 6/2018 | Kodaypak | H04W 76/10 |

FOREIGN PATENT DOCUMENTS

| | | |
|---|---|---|
| CN | 104380803 A | 2/2015 |
| CN | 105162716 A | 12/2015 |
| CN | 105681216 A | 6/2016 |
| CN | 105791175 A | 7/2016 |
| CN | 105934919 A | 9/2016 |
| EP | 2299754 A1 | 3/2011 |
| WO | 2016118636 A1 | 7/2016 |
| WO | 2016184045 A1 | 11/2016 |

\* cited by examiner

RESOURCE ADJUSTMENT METHOD, APPARATUS, AND SYSTEM

CROSS-REFERENCE TO RELATED APPLICATIONS

This application is a continuation of International Application No. PCT/CN2017/114220, filed on Dec. 1, 2017, which claims priority to Chinese Patent Application No. 201611220995.8, filed on Dec. 26, 2016, The disclosures of the aforementioned applications are hereby incorporated by reference in their entireties.

TECHNICAL FIELD

This application relates to the field of communications technologies, and in particular, to a resource adjustment method, apparatus, and system.

BACKGROUND

A communications network includes a network transport layer and a network function (NF) layer. The transport layer includes a router or a switch and a link between routers, a link between switches, or a link between a router and a switch. The router, the switch, and the link between routers, the link between switches, or the link between the router and the switch may be physical or virtual. The network function layer usually includes an external interface and a function module with function behavior that comply with a defined standard (for example, the Network Functions Virtualization NFV) standard of the European Telecommunications Standards Institute (ETSI)). The network function layer includes a control plane NF and a user plane NF. The control plane NF includes a mobility management entity (MME), a proxy call session control function (P-CSCF), or the like. The user plane NF includes a firewall, wide area network accelerator, or the like. These network functions may be physical network functions or virtualized network functions, run on a physical machine or a virtual machine, and need to be supported by an infrastructure resource such as a computing and storage capability. Data needs to be exchanged between NFs, and therefore, the NFs may be deployed at specific locations in a transport network (for example, the NFs are directly connected to a router or a switch).

Against the backdrop of virtualization and cloudification, virtualized deployment is implemented on many NFs. In a case of virtualized deployment, when service load changes, a virtualized NF may be flexibly scaled out or scaled in, to increase a service processing capability and a transmission capability.

In the prior art, a virtualized NF is scaled out or scaled in mainly based on an occupation status of NF resources. A scale-out effect is poor when only the NF is scaled out.

SUMMARY

Embodiments of this application provide a resource adjustment method, apparatus, and system, to adjust a resource by considering statuses of all network resources used for performing a service.

To achieve the foregoing objective, the embodiments of the present invention provide the following technical solutions:

According to a first aspect, an embodiment of the present application provides a resource adjustment method. The method includes: receiving, by a communications network, characteristic information of a service flow; then, determining, by the communications network, a transmission path of the service flow based on a correspondence between the characteristic information of the service flow and the transmission path of the service flow, where the transmission path includes a start network function NF and an end NF through which the service flow passes, and a link between the start NF and the end NF; and after the transmission path is determined, determining, by the communications network, a resource adjustment policy for the transmission path, to adjust a resource required by the service flow. In this solution, the entire transmission path of the service flow is determined, so that the resource adjustment policy can be determined by considering, based on a service requirement, all resources used for a service. This overcomes a prior-art disadvantage caused when scale-out is performed wherever resources are insufficient, thereby improving resource scale-out efficiency.

The communications network may include one or more of an orchestration device, a network function management device, and a network management device.

In a possible design, the communications network determines the resource adjustment policy for the transmission path based on the transmission path and resource occupation information of the service flow. The communications network may include the network function management device or the orchestration device.

In a possible design, the communications network first determines, based on the resource occupation information of the service flow, an infrastructure resource required by an NF on the transmission path; and then the communications network determines, based on the infrastructure resource required by the NF on the transmission path and an idle infrastructure resource of the NF on the transmission path, an NF that needs to be scaled out. In other words, in this embodiment of the present invention, a resource may be adjusted by scaling out the NF on the transmission path.

In a possible design, scale-out information of the NF that needs to be scaled out may be determined by the orchestration device in the communications network based on the infrastructure resource required by the NF on the transmission path and the idle infrastructure resource of the NF on the transmission path. In other words, in this embodiment of the present invention, the orchestration device may determine the scale-out information of the NF that needs to be scaled out.

In a possible design, the orchestration device in the communications network may send the characteristic information of the service flow and the resource occupation information of the service flow to an NF management device that manages the NF that needs to be scaled out, and then the NF management device determines scale-out information of the NF that needs to be scaled out. In other words, in this embodiment of the present invention, the NF management device of the NF that needs to be scaled out may determine, based on the correspondence and information from the orchestration device, the scale-out information of the NF that needs to be scaled out.

In a possible design, the orchestration device in the communications network may send the transmission path and the resource occupation information of the service flow to an NF management device that manages the NF that needs to be scaled out, and then the NF management device determines scale-out information of the NF that needs to be scaled out. In other words, in this embodiment of the present invention, the NF management device of the NF that needs to be scaled out may determine, based on the transmission path and the resource occupation information of the service flow, the scale-out information of the NF that needs to be scaled out.

In a possible design, the communications network determines, based on the resource occupation information of the service flow and idle bandwidth of a link included on the transmission path, a link that needs to be scaled out and scale-out information of the link. In other words, in this embodiment of the present invention, the orchestration device in the communications network may determine the link that needs to be scaled out and the scale-out information of the link.

In a possible design, the orchestration device in the communications network may determine, based on the transmission path of the service flow, a network management device that manages the link and that is on the transmission path, and then the orchestration device sends the characteristic information of the service flow and the resource occupation information of the service flow to the network management device, so that the network management device determines scale-out information of the link based on the resource occupation information of the service flow and the idle bandwidth of the link included on the transmission path. In other words, in this embodiment of the present invention, the network management device in the communications network may determine the link that needs to be scaled out and the scale-out information of the link.

In a possible design, the orchestration device in the communications network may determine, based on the transmission path of the service flow, a network management device that manages the link and that is on the transmission path, and then the orchestration device sends the transmission path and the resource occupation information of the service flow to the network management device, so that the network management device determines scale-out information of the link based on the resource occupation information of the service flow and the idle bandwidth of the link included on the transmission path.

In a possible design, the characteristic information of the service flow comes from a first network element; and correspondingly, the communications network determines, based on the transmission path and the resource occupation information of the service flow, an infrastructure resource required by the service flow; and then the communications network selects, based on the infrastructure resource required by the service flow, a second network element that is on the transmission path and that is at a previous hop of the first network element, to offload, to another network element, a part of the service flow sent by the second network element to the first network element.

In a possible design, the correspondence further includes a correspondence between characteristic information of an associated service flow associated with the service flow and a transmission path of the associated service flow; and the method further includes: determining, by the communications network, the transmission path of the associated service flow based on the characteristic information of the associated service flow and the transmission path of the associated service flow; and correspondingly, determining, by the communications network, the resource adjustment policy based on the resource occupation information, the transmission path of the service flow, and the transmission path of the associated service flow.

According to a second aspect, an embodiment of the present invention provides a resource adjustment apparatus. The resource adjustment apparatus has a function of implementing the orchestration device or the network function management device in the foregoing method embodiment. The function may be implemented by hardware, or may be implemented by hardware by executing corresponding software. The hardware or the software includes one or more modules corresponding to the foregoing function.

According to a third aspect, an embodiment of the present invention provides a resource adjustment apparatus, including a processor, a memory, a bus, and a communications interface. The memory is configured to store a computer execution instruction. The processor is connected to the memory by using the bus. When the device runs, the processor executes the computer execution instruction stored in the memory, so that the service flow resource adjustment apparatus performs the service flow resource adjustment method according to any possible design of the first aspect.

According to a fourth aspect, an embodiment of the present invention provides a resource adjustment system, including the orchestration device and the network function management device in the foregoing method embodiment or the foregoing apparatus embodiments.

According to a fifth aspect, an embodiment of the present invention provides a computer storage medium, configured to store a computer software instruction used by the foregoing orchestration device or the foregoing network function management device. The computer software instruction includes a program designed for the orchestration device or the network function management device to execute the foregoing aspects.

According to a sixth aspect, an embodiment of the present invention provides a computer program product. The computer program product includes a computer software instruction, and the computer software instruction may be loaded by a processor to implement the procedure of the resource adjustment method in any possible design of the first aspect.

In addition, for technical effects brought by any design manner of the second aspect to the sixth aspect, refer to technical effects brought by different design manners of the first aspect. Details are not described herein again.

These or other aspects of the present invention are clearer and more comprehensible in descriptions of the following embodiments.

DESCRIPTION OF EMBODIMENTS

The following describes the technical solutions in the embodiments of the present invention with reference to the accompanying drawings in the embodiments of the present invention. A specific operation method in a method embodiment may also be applied to an apparatus embodiment or a system embodiment. In the descriptions of this application, unless otherwise specified, "a plurality of" means two or more.

Architectures and service scenarios described in the embodiments of the present invention are intended to describe the technical solutions of the embodiments of the present invention more clearly, and do not constitute any limitation to the technical solutions provided in the embodiments of the present invention. A person of ordinary skill in the art may know that, with evolution of a network architecture and emergence of a new service scenario, the technical solutions provided in the embodiments of the present invention are also applicable to similar technical problems.

Figure 1:
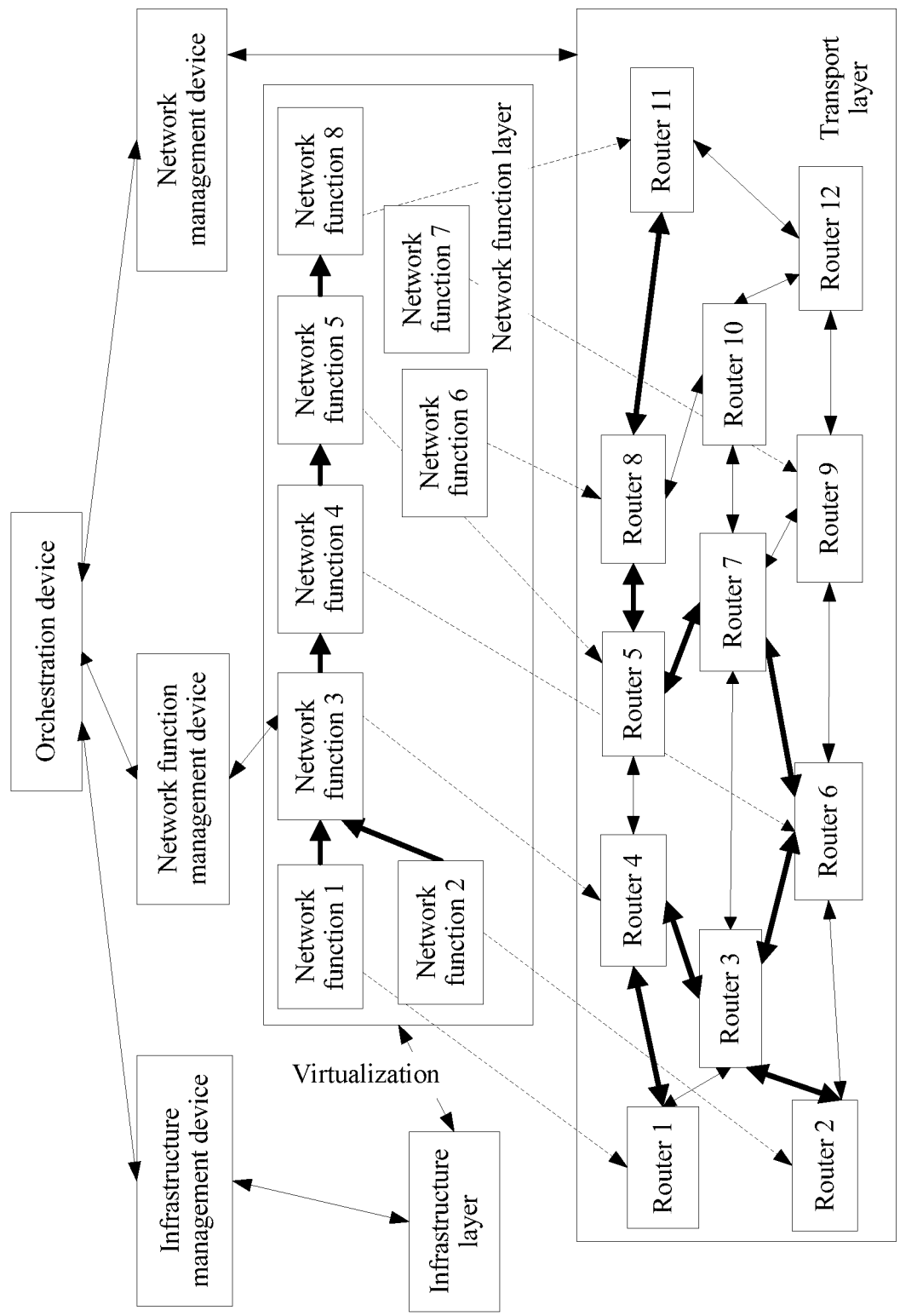
FIG. 1 is a schematic diagram of a possible network architecture according to an embodiment of the present invention.

FIG. 1 is a schematic diagram of a possible network architecture according to an embodiment of the present invention. The architecture includes a resource layer, a management device layer, and an orchestration device.

The resource layer is divided into an infrastructure layer, a transport layer, and a network function layer.

The infrastructure layer may include hardware resources for computing and storage. A virtual machine (VM) may be virtualized on the hardware resource. A virtualized network function (VNF) runs on the virtual machine. The infrastructure layer is managed by an infrastructure management device.

The transport layer may be an Internet Protocol (IP) transport network, and is managed by a network management device (network management unit). The network management device may be a software-defined network (SDN) controller, or may be another entity as networks evolve. This is not limited herein. A link device at the transport layer is managed or controlled by the network management device described below.

The network function layer includes a plurality of NFs and links connecting the different NFs. For example, the network function layer is presented as an evolved packet core (EPC) network including network functions such as an MME, a public data network gateway (PGW), a serving gateway (SGW), and a policy and charging rules function (PCRF).

Based on the three components of the resource layer, the management device layer may be divided into three types of management devices: an infrastructure management device, a network management device, and a network function management device. Although separately shown in the figure, the orchestration device and the network function management device may be alternatively integrated into one device in some implementations. In addition, each of the three types of management devices is shown as one management device in the figure, but each of the three types of management devices may include one or more management devices in actual implementation.

In the following descriptions, if no management device type is specified, the "management device" may be any one of the foregoing three types of management devices.

The infrastructure management device and the network management device are described above, and the NF management device is described herein.

One NF management device may manage or control one or more NFs. Generally, NFs in different management domains are managed by different NF management devices, and NFs in a same management domain may be managed by one or more NF management devices. The management domains may be classified based on different managers. For example, NFs of a same operator belong to a same management domain, and NFs of different operators belong to different management domains.

That the NF management device manages or controls the NF includes but is not limited to the following: The NF management device is responsible for configuring the NF, managing a life cycle, and further performing performance management, fault or alarm collection management, and the like. The NF management device may send a configuration command to the NF to change service behavior of the NF. For example, if the NF management device detects that congestion occurs in a next-hop NF 2 through which a service flow sent by an NF 1 passes, the NF management device delivers a configuration command to the NF 1 according to a policy, so that the NF 1 reduces a quantity of service flows sent to the NF 2.

The NF management device may further maintain service flow path information between NFs controlled by the NF management device. Certainly, the service flow path information may be alternatively maintained by an orchestration device at an upper layer of the NF management device.

In one implementation, a manner in which the NF management device or the orchestration device maintains the service flow path information may be: maintaining a correspondence between characteristic information of a service flow and transmission path information of the service flow. The characteristic information of the service flow may be represented by a message type (for example, a registration message) of the service flow, or may be represented by metadata (metadata) that is carried in a packet header of the service flow and that is used to identify a characteristic of the service flow, or may be represented by a packet length of a service flow packet, or may be represented by a parameter carried in a message type of the service flow. This is not limited in this application provided that service flows can be distinguished according to an identification rule. The transmission path information of the service flow includes a start NF and an end NF through which the service flow passes, and a link between the start NF and the end NF. There may be no other NFs between the start NF and the end NF, or there may be one or more other NFs. There is a link between every two adjacent NFs. For two adjacent NFs such as an NF A and an NF B on a transmission path of the service flow, if the service flow successively passes through the NF A and the NF B in a transmission process of the service flow, a next hop of the NF A may be the NF B, and a previous hop of the NF B may be the NF A. The correspondence may be described in a form of a table or in a form of a graph. This is not limited in this application.

A link between NFs is an abstract link, and a link that can be mapped to the transport layer. For example, from a perspective of the network function layer, there is a network function layer link that directly connects a network function 2 (NF 2) and a network function 3 (NF 3). However, the link mapped to the transport layer passes through three routers and two links. As shown, in FIG. 1, the NF 2 is directly connected to a router 2, and the NF 3 is directly connected to a router 4. The link between the NF 2 and the NF 3 (which may be referred to as a link NF 2→NF 3 for short) is mapped to the transport layer, and includes two links connected in series: router 2→router 3 and router 3→router 4.

Table 1 is used as an example below to describe the foregoing correspondence.

TABLE 1

| Characteristic information of a service flow | Transmission path of the service flow |
|---|---|
| Registration message | NF 1->NF 3, NF 2->NF 3, NF 3->NF 4, NF 4->NF 5, NF 5->NF 8, NF 3->NF 7, NF 7->NF 5 |
| Notify message | NF 1->NF 3, NF 2->NF 3, NF 3->NF 4, NF 4->NF 5 |

As shown in Table 1, a path through which the registration message passes is: NF 1→NF 3→NF 4 or NF 7→NF 5→NF 8; or NF 2→NF 3→NF 4 or NF 7→NF 5→NF 8. A path through which the notify message passes is: NF 1→NF 3→NF 4→NF 5; or NF 2→NF 3→NF 4→NF 5.

Based on this table, when congestion occurs, a transmission path of a service flow that causes congestion is found based on characteristic information of the service flow, so that a source and a destination of the service flow can be known.

Figure 2:
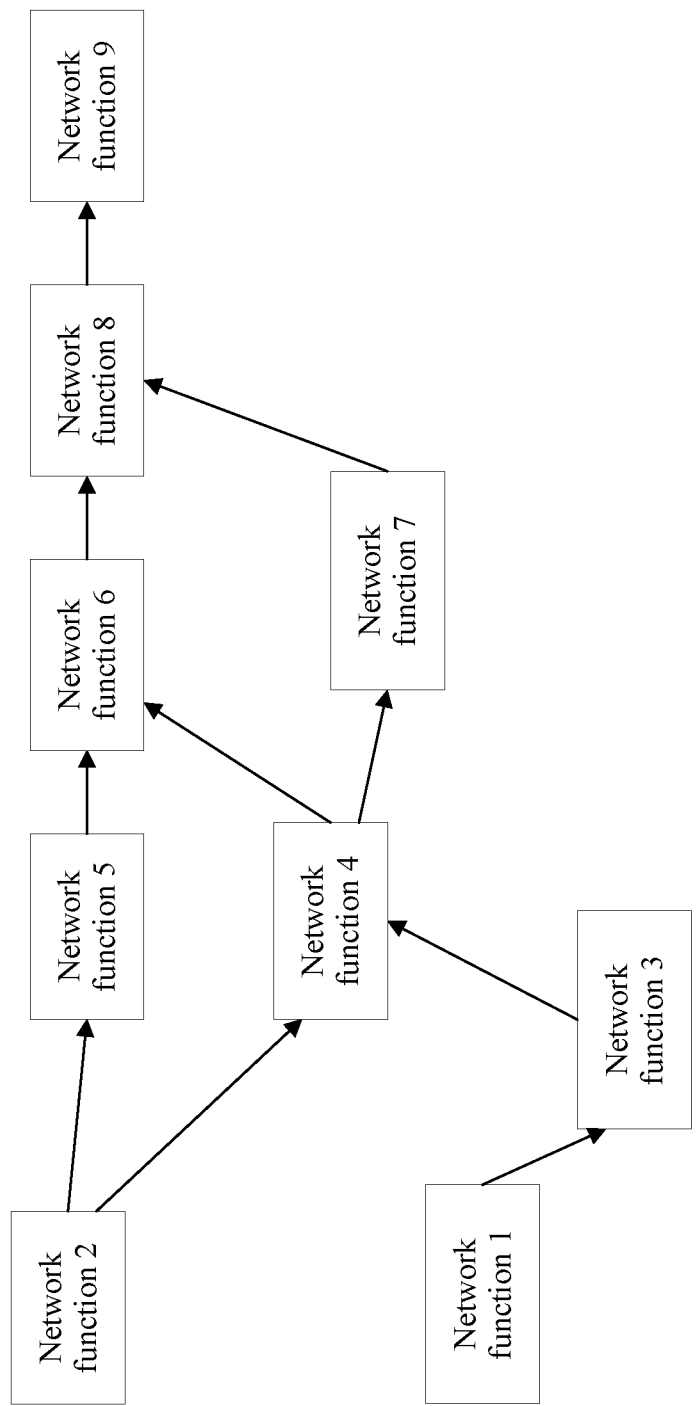
FIG. 2 is a schematic diagram of a service flow transmission path according to an embodiment of the present invention.

FIG. 2 shows the foregoing correspondence. In FIG. 2, a transmission path of a service flow is tree-shaped. As shown by the arrows, there are a plurality of paths along which a service message is sent from an NF 1 or an NF 2 to an NF 9. A correspondence shown in FIG. 2 may be alternatively converted into Table 2.

TABLE 2

| Characteristic information of a service flow | Transmission path of the service flow |
|---|---|
| Registration message | NF 1->NF 3, NF 2->NF 4, NF 2->NF 5, NF 3->NF 4, NF 4->NF 6, NF 4->NF 7, NF 5->NF 6, NF 6->NF 8, NF 7->NF 8, NF 8->NF 9 |

The orchestration device is described below. Generally, there are a plurality of infrastructure management devices, a plurality of network management devices, and a plurality of network function management devices in a network. A single management device usually can control only resources in a region. Implementation of many services relates to a plurality of types of resources in different regions or different management domains, and correspondingly relates to a plurality of management devices. Working together of these management devices usually needs to be coordinated by an upper-layer orchestration function. In this application, the function used to coordinate the working together of the management devices is referred to as the orchestration device. The management domain and the region are two dimensions. A same region may include a plurality of management domains, and each management domain has a management device. If a region span of a same management domain is very large, in consideration of factors such as delay control, the management domain may be divided into parts that are controlled by a plurality of management devices.

The orchestration device has a more global perspective than the management device. Resources required by a service may be managed by a plurality of management devices (these management devices include one or more of an infrastructure management device, a network management device, and a network function management device, and one or more management devices of each type of management device are required because of the management domain and the region). If there is more than one management device, the management devices need to be coordinated. The orchestration device divides resource requirements of a service by domains and delivers the resource requirements to the management devices, and each management device is responsible for controlling resources in a domain in which the management device is located. However, in actual implementation, it is not excluded that interfaces of management devices interact with each other without using the orchestration device, which is equivalent to that a function of the orchestration device is integrated into a management device, so that a network structure is simplified.

The infrastructure management device, the network management device, and the network function management device mentioned above are logical functional entities, and may have separate physical entities physically, or may be extended functions in existing network functional entities. For example, the infrastructure management device may exist in a virtualized infrastructure manager (VIM) in an ETSI NFV architecture, a function of the network management device may exist in an SDN controller, and a function of the network function management device may exist in one or more of an element management system (EMS), a virtualized network function manager (VNFM), or an NFV management and orchestration (MANO) entity. The function of the orchestration device may also exist in the NFV MANO, or global service orchestration (GSO) of an OPEN-O open source project, or may exist in one or more of an operation support system (OSS) or other orchestration devices. The three types of management devices may be alternatively otherwise defined entities.

In addition, the management device and the orchestration device each may be implemented hierarchically. For example, the network management device may be divided into a domain-based management device and a cross-domain management device, and the orchestration device may also be divided into a domain-based orchestration device and a cross-domain orchestration device. If the network function management device is located in the EMS, the EMS may manage one or more network functional entities.

The name of the infrastructure management device does not constitute a limitation on the device. In practice, the infrastructure management device may have another name, for example, infrastructure controller (Infrastructure Controller). The name of the network management device does not constitute a limitation on the device. In practice, the network management device may have another name, for example, network controller (Infrastructure Controller). The name of the network function management device does not constitute a limitation on the device. In practice, the network function management device may have another name, for example, NF controller (NF Controller). The name of the orchestration device does not constitute a limitation on the device. In practice, the orchestration device may have another name, for example, orchestrator, "cross-domain orchestration functional entity", or another name. Uniform descriptions are provided herein, and details are not described below again.

Various embodiments of the present invention provide a resource adjustment method. In the method, during resource adjustment, statuses of all network resources used for completing a service are considered, to resolve a prior-art problem that only a phase in which resources are insufficient is processed.

For example, the inventor finds that many scenarios cannot be resolved based on the solutions in the prior art. For example, when a plurality of base stations recover simultaneously after a fault occurs, a large quantity of network attachment messages are generated simultaneously, and consequently, an MME is overloaded, and congestion occurs because the MME fails to process some messages in time. This triggers automatic scale-out of the MME. However, after the MME is scaled out, a large quantity of messages for accessing a home subscriber server (HSS) are generated. Consequently, the HSS is overloaded and congestion occurs. This triggers automatic scale-out of the HSS. Because scale-out is successively performed in series, and several minutes or more time need to be consumed in each time of scale-out, total scale-out time is relatively long. In addition, there is no overall consideration, and excessive resources are allocated during scale-out of the MME. Therefore, when the HSS also needs to be scaled out, it is found that there is no idle resource for scale-out of the HSS, and consequently a processing capability of a network encounters a bottleneck on the HSS. For another example, after a large quantity of subscription messages cause network congestion, the congestion caused by the subscription messages is resolved through scale-out, but a large quantity of service provisioning messages generated subsequently cause congestion again. In these scenarios, a plurality of network functions need to be arranged and scheduled together based on an actual service requirement, and a resource adjustment solution with a better overall effect is selected with reference to the service requirement and an actual status of available resources.

The resource adjustment method provided in the embodiments of the present invention may be applied to the network architecture shown in FIG. 1, may be applied to a scenario in which congestion occurs on an NF, may be applied to a scenario in which congestion occurs on a link, may be applied to a scenario in which no congestion occurs currently but congestion is predicted to occur based on an increasing trend of central processing unit (CPU) usage, or may be applied to another scenario that may require resource adjustment.

First, a communications network receives characteristic information of a service flow, and then the communications network determines a transmission path of the service flow based on a correspondence between the characteristic information of the service flow and the transmission path of the service flow. Then, the communications network determines a resource adjustment policy for the transmission path, to adjust a resource required by the service flow. According to the resource adjustment method provided in this application, based on an actual service requirement, when a resource needs to be adjusted, network functions or links used for completing a service are considered together, and an adjustment policy is determined with reference to the service requirement and a status of available resources in a network. Then, the resource required by the service flow is adjusted according to the adjustment policy, so that network resources are used more optimally.

The transmission path includes a start NF and an end NF through which the service flow passes, and a link between the start NF and the end NF. Determining the resource adjustment policy for the transmission path may be: determining the resource adjustment policy for the transmission path based on the transmission path and resource occupation information of the service flow. The resource occupation information may be received from another device by a device that determines the resource adjustment policy, or may be preset on a device that determines the resource adjustment policy. For example, when a degree of NF or link congestion is not determined, a congestion degree is changing and is not a stable value, or the like, the resource occupation information of the service flow may fail to be received. In this case, a network function or a transmission link on the transmission path may be scaled out based on a default value or a preset value (for example, a computing resource of a 3.2 GHz CPU of a specific model and a storage resource of 200 M are added).

The resource occupation information of the service flow may be bandwidth, or a quantity of messages in unit time.

The resource adjustment policy may be: determining a to-be-scaled-out object on the transmission path of the service flow, or determining a to-be-scaled-out object on the transmission path of the service flow and scale-out information of each object, or offloading the service flow to alleviate a congestion status of a network function or a link on which congestion occurs. This is not limited in this application.

There are many functional network elements in the communications network. Various functions may be flexibly implemented by using different network elements, and various types of information may also be flexibly stored in different network elements. In the foregoing method, the communications network includes one or more of the following devices: an NF management device, an orchestration device, or a network management device. The correspondence may be stored on any one of the NF management device, the orchestration device, or the network management device. For an implementation method, refer to the following method embodiments. A person skilled in the art can design flexible and diversified communications network implementation solutions based on the content of the embodiments of the present invention. Some possible implementations of the embodiments of the present invention in the communications network are described below by using only several instantiated solutions. Regardless of how names, locations, and interaction relationships of these network elements change in the future, these network elements fall within the protection scope of the present invention provided that these network elements have functions of the communications network in the embodiments of the present invention.

In an implementation, the orchestration device may receive the characteristic information of the service flow, and then the orchestration device determines a to-be-scaled-out object, for example, a to-be-scaled-out NF, a to-be-scaled-out link, or both a to-be-scaled-out NF and a to-be-scaled-out link. After the to-be-scaled-out object is determined, scale-out information (in other words, a scale-out amount) of the NF may be determined by the NF management device, or may be determined by the orchestration device, and scale-out information of the link may be determined by the network management device, or may be determined by the orchestration device.

In an implementation, the NF management device may receive the characteristic information of the service flow, and then the NF management device determines a to-be-scaled-out object, for example, a to-be-scaled-out NF, a to-be-scaled-out link, or both a to-be-scaled-out NF and a to-be-scaled-out link. After the to-be-scaled-out object is determined, scale-out information (in other words, a scale-out amount) of the NF may be determined by the NF management device, or may be determined by the orchestration device, and scale-out information of the link may be determined by the network management device, or may be determined by the orchestration device.

In an implementation, the NF management device may receive the characteristic information of the service flow, and then the NF management device determines to offload the service flow.

In an implementation, the orchestration device may receive the characteristic information of the service flow, and then the orchestration device determines to offload the service flow, or determines an object that needs to be scaled out. The object that needs to be scaled out may be an NF, a link, or an NF and a link. Scale-out information of the NF that needs to be scaled out may be determined by the orchestration device or the NF management device that manages the NF, and scale-out information of the link that needs to be scaled out may be determined by the orchestration device or the network management device that manages the link.

In an implementation, a resource can be adjusted based on information about an associated service flow associated with the service flow, in addition to information about the service flow. The orchestration device or the management device may be implemented by using a computer device (or system) shown in FIG. 3.

Figure 3:
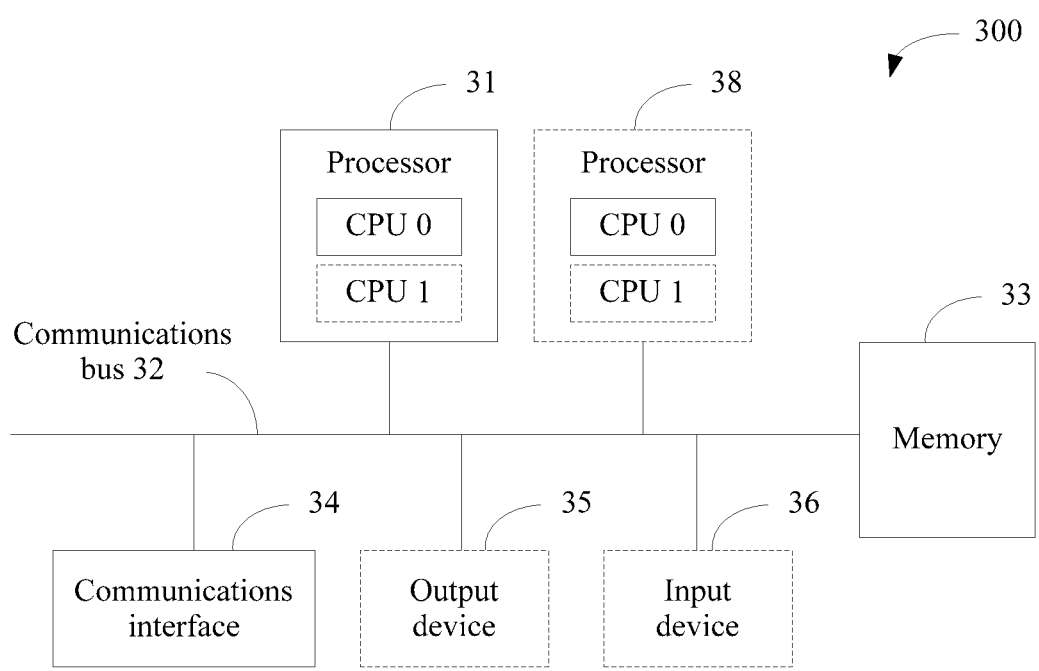
FIG. 3 is a schematic diagram of a computer device according to an embodiment of the present invention.

FIG. 3 is a schematic diagram of a computer device according to an embodiment of the present invention. The computer device 300 includes at least one processor 31, a communications bus 32, a memory 33, and at least one communications interface 34.

The processor 31 may be a general-purpose central processing unit (CPU), a microprocessor, an application-specific integrated circuit (ASIC), or one or more integrated circuits configured to control program execution in the solutions of the present invention.

The communications bus 32 may include a channel used for transmitting information between the foregoing components. The communications interface 34 is any apparatus such as a transceiver, and is configured to communicate with another device or a communications network, such as the Ethernet, a radio access network (RAN), or a wireless local area network (WLAN).

The memory 33 may be a read-only memory (ROM) or another type of static storage device capable of storing static information and instructions, or a random access memory (RAM) or another type of dynamic storage device capable of storing information and instructions; or may be an electrically erasable programmable read-only memory (EEPROM), a compact disc read-only memory (CD-ROM) or other compact disc storage, optical disc storage (including a compressed optical disc, a laser disc, an optical disc, a digital universal optical disc, a Blu-ray optical disc, and the like), a magnetic disk storage medium or another magnetic storage device, or any other medium capable of carrying or storing expected program code in a form of instructions or data structures and capable of being accessed by a computer, but is not limited thereto. The memory may exist independently, and is connected to the processor by using the bus. Alternatively, the memory may be integrated into the processor.

The memory 33 is configured to store application program code used for executing the solutions of the present invention, and the execution is controlled by the processor 31. The processor 31 is configured to execute the application program code stored in the memory 33.

In one implementation, in an embodiment, the processor 31 may include one or more CPUs, for example, a CPU 0 and a CPU 1 in FIG. 3.

In one implementation, in an embodiment, the computer device 300 may include a plurality of processors, such as the processor 31 and a processor 38 in FIG. 3. Each of the processors may be a single-core (single-CPU) processor, or may be a multi-core (multi-CPU) processor. The processor herein may be one or more devices, a circuit, and/or a processing core used for processing data (such as a computer program instruction).

In one implementsation, in an embodiment, the computer device 300 may further include an output device 35 and an input device 36. The output device 35 communicates with the processor 31, and can display information in a plurality of manners. For example, the output device 35 may be a liquid crystal display (LCD), a light emitting diode (LED) display device, a cathode ray tube (CRT) display device, or a projector (projector). The input device 36 communicates with the processor 31, and can receive user input in a plurality of manners. For example, the input device 36 may be a mouse, a keyboard, a touchscreen device, or a sensing device.

The computer device 300 may be a general-purpose computer device or a dedicated computer device. In specific implementation, the computer device 300 may be a desktop computer, a portable computer, a network server, a palmtop computer (PDA), a mobile phone, a tablet computer, a wireless terminal device, a communications device, an embedded device, or a device with a structure similar to that in FIG. 3. A type of the computer device 300 is not limited in this embodiment of the present invention.

For example, the orchestration device in FIG. 1 may be the device shown in FIG. 3, and a memory of the orchestration device stores one or more software modules. The orchestration device may implement the software module by using a processor and program code in the memory, and adjust a resource for a service flow.

Alternatively, the NF management device in FIG. 1 may be the device shown in FIG. 3, and a memory of the NF management device stores one or more software modules. The NF management device may implement the software module by using a processor and program code in the memory, and adjust a resource for a service flow.

Alternatively, the network management device in FIG. 1 may be the device shown in FIG. 3, and a memory of the network management device stores one or more software modules. The network management device may implement the software module by using a processor and program code in the memory, and adjust a resource for a service flow.

Figure 4:
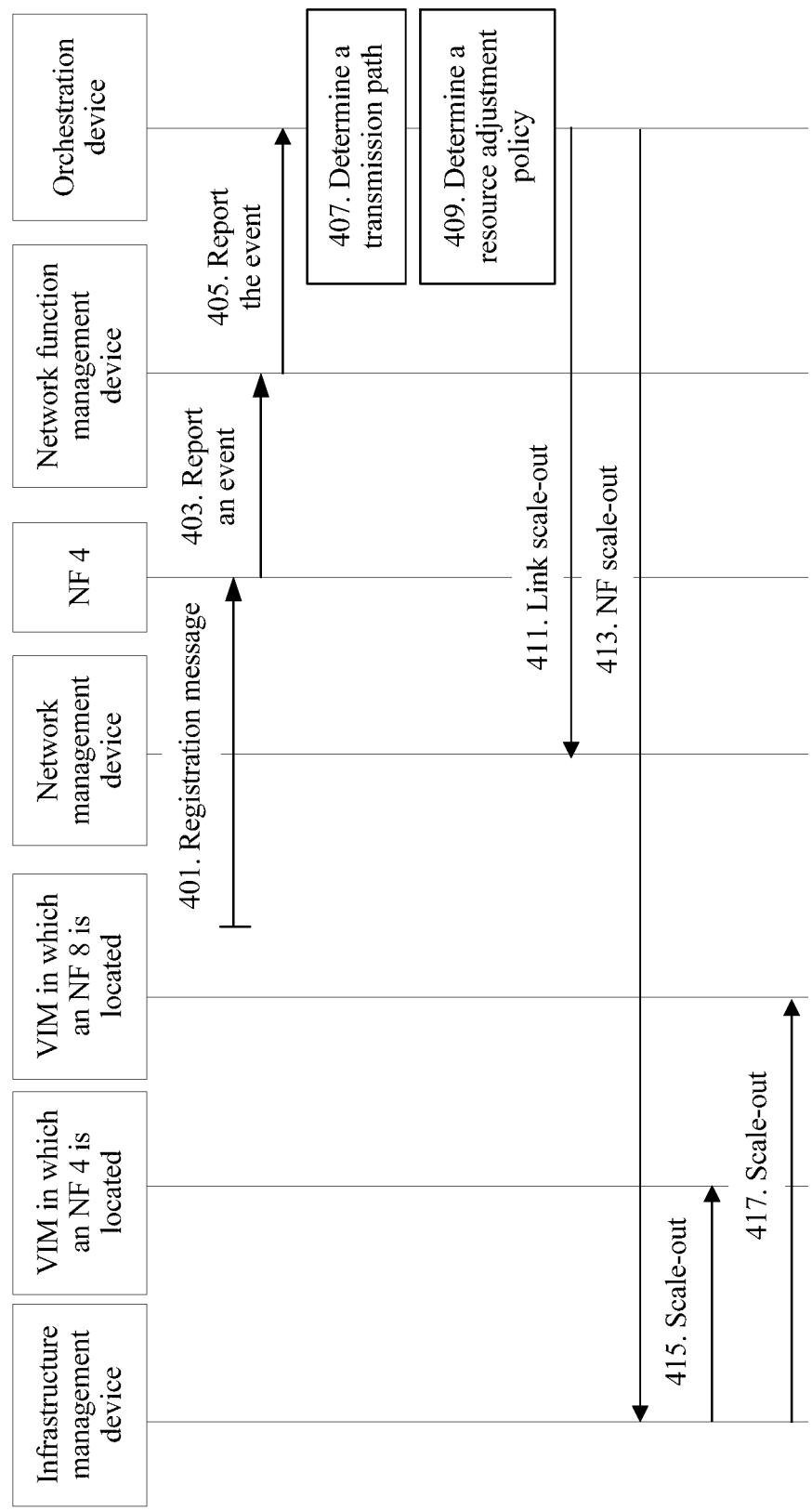
FIG. 4 is a schematic flowchart of a resource adjustment method according to an embodiment of the present invention.

FIG. 4 is a schematic flowchart of a resource adjustment method according to an embodiment of the present invention. The method may be applied to the network architecture shown in FIG. 1.

Step 401: An NF 4 receives a large quantity of burst registration messages from an NF 3 (not shown in the figure), and the NF 4 receives the registration messages.

Message congestion is caused because a central processing unit CPU of the NF 4 has insufficient processing capabilities.

Step 403: The NF 4 reports, to a network function management device that manages the NF 4, an event that load of the NF 4 suddenly increases, and the NF management device receives the event.

The event carries a type (namely, a registration message) of the messages that cause congestion and resource occupation information of a burst service flow. The resource occupation information may be a total quantity of registration messages in unit time, or may be bandwidth of the burst service flow. In this embodiment, the resource occupation information is described by using the total quantity of registration messages in unit time as an example.

After the NF management device receives the event, in any one of the following cases, the NF management device performs step 405.

(1) The NF management device cannot obtain the foregoing correspondence between characteristic information of the service flow and a transmission path of the service flow. That the correspondence cannot be obtained herein may mean that the NF management device does not store the correspondence, or the NF management device cannot obtain the correspondence from another device.

(2) The NF management device determines, based on a correspondence table, that the registration messages further need to pass through an NF or a link in another domain subsequently.

(3) The NF management device is preconfigured to report the event to an upper-level orchestration device.

Step 405: The NF management device reports, to an orchestration device, the event that the load suddenly increases, and the orchestration device receives the event.

The event carries the foregoing message type and the resource occupation information of the burst service flow.

After receiving the reported event in step 403, the NF management device may directly send the reported event to the orchestration device, or may convert a format of a received message and then send the message to the orchestration device. A specific implementation is not limited in this application.

In one implementation, in an solution, the event may further carry NF 4 scale-out information determined by the NF management device. When determining NF 4 scale-out information, the orchestration device may choose to use the NF 4 scale-out information determined by the NF management device, may modify the NF 4 scale-out information decided by the NF management device, or may determine the NF 4 scale-out information.

Step 407: The orchestration device determines a transmission path of the registration message based on a correspondence between characteristic information of a service flow and a transmission path of the service flow.

Herein, it is assumed that the transmission path of the registration message is shown in Table 1. Therefore, the orchestration device determines, based on the correspondence table, that the registration message is to pass through an NF 5 and an NF 8 subsequently. The NF 4, the NF 5, and the NF 8 may be managed by a same NF management device, or may not be managed by a same NF management device.

The correspondence may be stored by the orchestration device, or may be obtained by the orchestration device from another device (for example, a network function management device). This is not limited in this application.

Step 409: The orchestration device determines a resource adjustment policy for the registration message based on resource occupation information and the transmission path of the registration message.

In one implementation, first, the orchestration device determines infrastructure resource overheads of the burst registration messages based on the total quantity of registration messages in unit time and an average infrastructure resource required for processing a single registration message. The average infrastructure resource required for processing a single registration message may be obtained by using empirical data or preconfigured data.

In some embodiments, the infrastructure resource overheads of the burst registration messages may be obtained by multiplying the total quantity of registration messages by average infrastructure resource overheads of a single registration message, or the infrastructure resource overheads may be determined by using another method. This is not limited in this application. The infrastructure resource overheads of the registration messages are applicable to all NFs on the transmission path. In this embodiment, for example, one CPU core at a frequency of 2.2 GHz and storage space of 100 M need to be increased to process newly added 1000 registration messages per second. Therefore, two CPU cores at a frequency of 2.2 GHz and storage space of 200 M need to be increased if 2000 registration messages are added per second.

Then, the orchestration device determines, with reference to idle infrastructure resources of the NF 4, the NF 5, and the NF 8, whether the NF 4, the NF 5, and the NF 8 need to be scaled out. The orchestration device may obtain the idle infrastructure resource in the following manner: The network function management device periodically reports the idle infrastructure resource to the orchestration device, or the orchestration device searches the network function management device for the idle infrastructure resource. This is not limited in this application. A scale-out amount may be obtained by subtracting the idle infrastructure resource from the infrastructure resource overheads of the burst registration messages, or by subtracting the idle infrastructure resource from the infrastructure resource overheads of the burst registration messages and then adding a specific margin. This is not limited in this application.

In this embodiment, it is assumed that an idle infrastructure resource of the NF 4 and an idle infrastructure resource of the NF 8 each are less than the infrastructure resource overheads required by the burst registration messages, and therefore, the NF 4 and the NF 8 need to be scaled out. It is assumed that the idle infrastructure resource of the NF 4 and the idle infrastructure resource of the NF 8 each are two CPU cores of 0.2 GHz and storage space of 20 M, and the NF 4 and the NF 8 each need to be scaled out by two CPU cores of 2 GHz and storage space of 180 M.

When determining an NF that needs to be scaled out, if the orchestration device receives information related to congestion on the NF 4, during determining of scale-out of an NF, the orchestration device does not need to determine, with reference to the idle infrastructure resource of the NF 4, whether the NF 4 needs to be scaled out.

In addition, the orchestration device determines, based on a bandwidth occupation status of a link NF 4→NF 5 and a link NF 5→NF 8 and bandwidth information of the burst service flow (namely, the registration messages), whether a link needs to be scaled out. If an idle transmission capability (namely, idle bandwidth information) of the link is less than the bandwidth information of the burst service flow, transmission bandwidth of the link is increased. An amount of increased bandwidth may be the bandwidth of the burst service flow minus the idle transmission capability of the link, or may be the bandwidth of the burst service flow minus the idle transmission capability of the link plus a specific margin. This is not limited in this application.

The bandwidth information may be obtained based on the total quantity of registration messages, or may be determined based on a default or preset value (for example, 100 M bandwidth is increased each time). For example, the bandwidth information is obtained by multiplying the quantity of messages by an average length of the messages. A specific manner is not limited in this application.

In this embodiment, it is assumed that an idle bandwidth resource of the link NF 4→NF 5 and an idle bandwidth resource of the link NF 5→NF 8 each are less than bandwidth information required by the burst registration messages. Therefore, the link NF 4→NF 5 and the link NF 5→NF 8 need to be scaled out. If the link bandwidth scale-out method is used, it is determined that 300 M bandwidth needs to be separately increased for the link NF 4→NF 5 and the link NF 5→NF 8.

Step 411: The orchestration device sends a link scale-out message to a network management device that manages a link that needs to be scaled out, and the network management device receives the link scale-out message.

The link scale-out message may carry link identification information and bandwidth requirement information of the link NF 4→NF 5 and the link NF 5→NF 8 that need to be scaled out. The network management device scales out, based on the bandwidth requirement information, a link corresponding to a link identifier.

FIG. 4 shows only one network management device. However, in some implementations, there may be a plurality of network management devices that manage the link that needs to be scaled out. If there are a plurality of network management devices, the orchestration device separately sends, to the plurality of network management devices, scale-out messages of links managed by the network management devices.

Step 413: The orchestration device sends an NF scale-out message to an infrastructure management device in which an infrastructure of each NF is located, and the infrastructure management device receives the NF scale-out message, where there may be one or more infrastructure management devices, and one infrastructure management device is used as an example herein.

The scale-out message may carry identification information of an NF that needs to be scaled out and new capacity information of each NF.

FIG. 4 shows only one infrastructure management device. However, in some implementations, the infrastructures of the NFs may be located in a plurality of infrastructure management devices. If there are a plurality of infrastructure management devices, the orchestration device separately sends the NF scale-out message to the infrastructure management devices in which the infrastructures of the NFs are located.

In addition, the NF scale-out message in step 413 may be first sent by the orchestration device to a network function management device in which each NF that needs to be scaled out is located. Then, the network function management device sends an NF scale-out request to the infrastructure management device in which the infrastructure of each NF is located. For example, in an ETSI NFV architecture, the orchestration device corresponds to network functions virtualization orchestrator (NFVO), the network function management device corresponds to a VNFM, and the infrastructure management device corresponds to a VIM. There are two manners for scaling out/in (scaling out or scaling in) virtual resources. The first manner is: After obtaining authorization from the NFVO, the VNFM sends an instruction to the VIM to scale out/in resources. The second manner is: The VNFM sends an instruction to the NFVO, and the NFVO sends the instruction to the VIM to scale out/in resources. This is not limited in this application.

FIG. 4 shows only one network function management device. However, in specific implementation, there may be a plurality of network function management devices that manage the NF that needs to be scaled out. If there are a plurality of network function management devices, the orchestration device separately sends the NF scale-out message to the network function management devices that manage the NFs.

Step 415: The infrastructure management device sends a scale-out request to a VIM in which a resource of the NF 4 is located to scale out an infrastructure, where the request carries an identifier of the resource used by the NF 4 and scale-out information of the NF 4, so that the NF 4 is scaled out synchronously for processing of a newly added registration service flow.

Step 417: The infrastructure management device sends a scale-out request to a VIM in which a resource of an NF 8 is located to scale out an infrastructure, where the request carries an identifier of the resource used by the NF 8 and scale-out information of the NF 8, so that the NF 8 is scaled out synchronously for processing of a newly added registration service flow.

There is no sequence for performing step 411 and steps 413 to 417. In addition, there is no sequence for performing step 415 and step 417.

According to the method provided in this embodiment, in a scenario in which congestion occurs because the NF 4 receives a large quantity of registration messages, statuses of the NF 5, the NF 8, and the link on the transmission path through which the registration message passes may be comprehensively considered, so that not only the NF 4 is scaled out, but also the NF 8, the link between the NF 4 and the NF 5, and the link between the NF 5 and the NF 8 are scaled out. In this way, corresponding scale-out processing is performed for congestion with reference to a status of the entire transmission path, so that resource scale-out efficiency is improved.

In the embodiment shown in FIG. 4, actions of the orchestration device may be executed by the orchestration device based on the software module in the memory mentioned above. Actions of the network function management device may be executed by the network function management device based on the software module in the memory mentioned above. Actions of the network management device may be executed by the network management device based on the software module in the memory mentioned above. This is not limited in this embodiment of this application.

Figure 5:
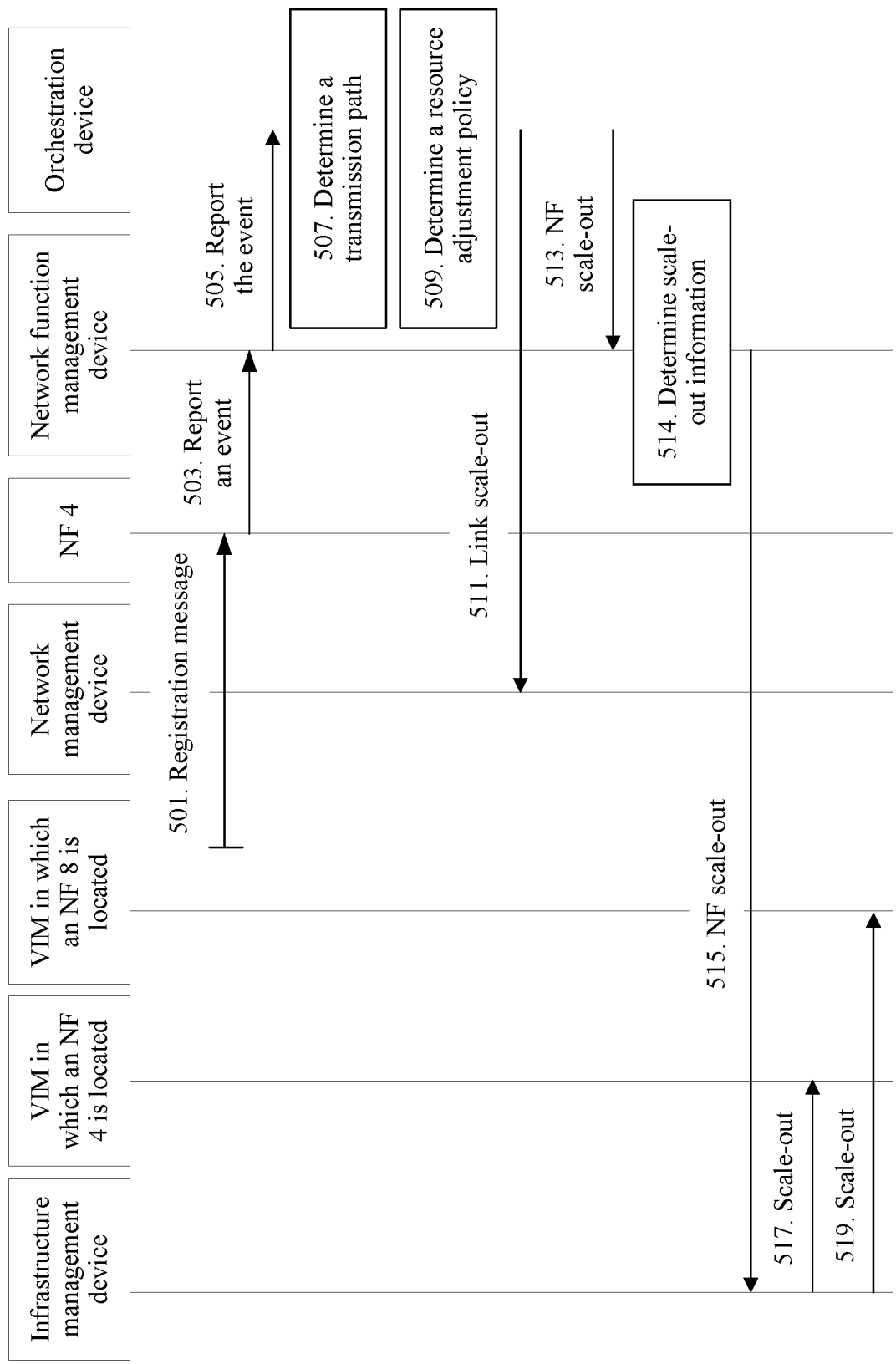
FIG. 5 is a schematic flowchart of another resource adjustment method according to an embodiment of the present invention.

FIG. 5 is a schematic flowchart of another resource adjustment method according to an embodiment of the present invention. The method may be applied to the network architecture shown in FIG. 1. A main difference from the embodiment shown in FIG. 4 lies in that, in this embodiment, an orchestration device determines a to-be-scaled-out object, and another device determines scale-out information of the to-be-scaled-out object. Details are described below.

Steps 501 to 507 are the same as steps 401 to 407. Details are not described herein again.

Step 509: The orchestration device determines a resource adjustment policy for the registration message based on resource occupation information and the transmission path of the registration message.

As in step 409, it is assumed that the orchestration device determines that an NF 4 and an NF 8 need to be scaled out, and a link NF 4→NF 5 and a link NF 5→NF 8 need to be scaled out.

Step 511: The orchestration device sends a link scale-out message to a network management device that manages a link that needs to be scaled out, and the network management device receives the link scale-out message.

The link scale-out message carries link identification information of the link NF 4→NF 5 and the link NF 5→NF 8 that need to be scaled out and resource occupation information of a burst service flow to the network management device of the link that needs to be scaled out. The network management device determines link scale-out information based on the resource occupation information of the burst service flow. For a method for determining the scale-out information by the network management device, refer to the method for determining the scale-out information by the orchestration device in step 409.

Then, the network management device scales out, based on bandwidth information, a link corresponding to a link identifier.

In one implementation, alternatively, the orchestration device may first determine bandwidth information of the burst service flow, and then adds identification information of a link that needs to be scaled out and the bandwidth information to the link scale-out information.

Step 513: The orchestration device sends an NF scale-out message to an NF management device of an NF that needs to be scaled out, and the NF management device receives the NF scale-out message.

The scale-out message sent by the orchestration device to the NF management device needs to carry identification information of the NF that needs to be scaled out and the resource occupation information. The NF management device determines the scale-out information of the NF based on the resource occupation information and an idle infrastructure resource of the NF. For a method for determining the scale-out information of the NF by the NF management device, refer to the method for determining the scale-out information of the NF by the orchestration device in step 409.

Step 515: A network function management device sends the NF scale-out message to an infrastructure management device, and the infrastructure management device receives the NF scale-out message.

The scale-out message may carry identification information of the NF 4 and the NF 8 that need to be scaled out and information about capacities that need to be expanded for the NF 4 and the NF 8.

Steps 517 and 519 are the same as steps 415 and 417.

There is no sequence for performing step 511 and steps 513 to 519. In addition, there is no sequence for performing step 517 and step 519.

As in FIG. 4, one infrastructure management device, one network management device, and one network function management device are shown in FIG. 5. However, in practice, there may be a plurality of infrastructure management devices, a plurality of network management devices, and a plurality of network function management devices.

According to the method provided in this embodiment, the orchestration device determines to-be-scaled-out objects. The NF 4, the NF 8, the link between the NF 4 and the NF 5, and the link between the NF 5 and the NF 8 are to be scaled-out. Scale-out information of the NF 4 and scale-out information of the NF 8 are determined by the network function management device. Scale-out information of the link between the NF 4 and the NF 5 and scale-out information of the link between the NF 5 and the NF 8 are determined by the network management device. Therefore, corresponding scale-out processing is performed for congestion with reference to a status of the entire transmission path, so that resource scale-out efficiency is improved.

In the embodiment shown in FIG. 5, actions of the orchestration device may be executed by the orchestration device based on the software module in the memory mentioned above. Actions of the network function management device may be executed by the network function management device based on the software module in the memory mentioned above. Actions of the network management device may be executed by the network management device based on the software module in the memory mentioned above. This is not limited in this embodiment of this application.

In one implementation, the methods for determining scale-out information in FIG. 4 and FIG. 5 may also be combined for use. In other words, the orchestration device determines scale-out information of some to-be-scaled-out objects, and the NF management device and the network management device determine scale-out information of other NFs and links.

In some implementations, there are a plurality of specific scale-out manners. In FIG. 4 and FIG. 5, scale-out is described by using an example in which both the NF and the link are scaled out. However, in specific implementation, it may be figured out that only the NF may be scaled out but the link is not scaled out, or only the link may be scaled out but the NF is not scaled out. A method for scaling out the NF or the link is similar to the method for scaling out the NF or the link in FIG. 4 or FIG. 5, and details are not described herein again.

Figure 6:
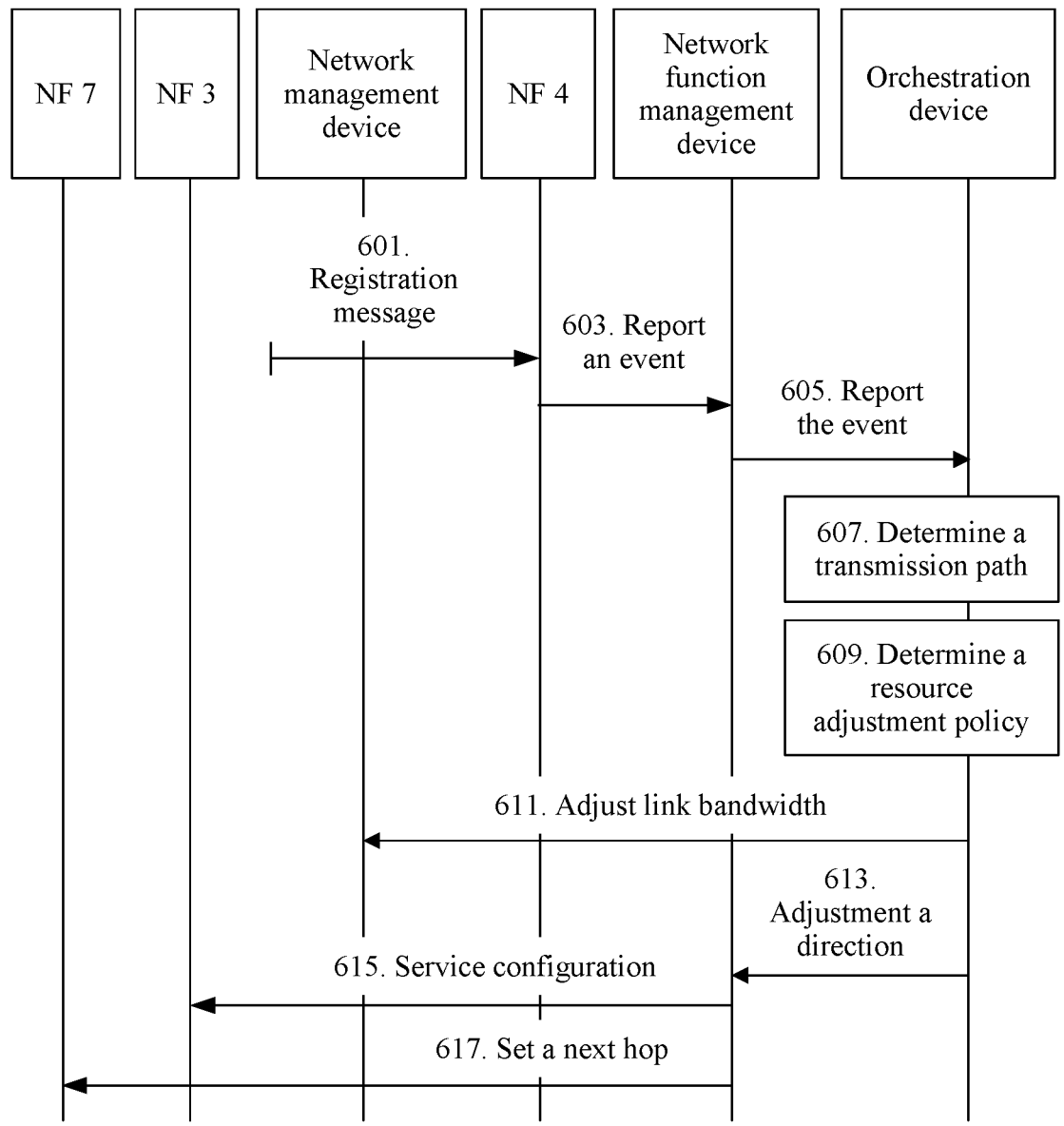
FIG. 6 is a schematic flowchart of another resource adjustment method according to an embodiment of the present invention.

FIG. 6 is a schematic flowchart of another resource adjustment method according to an embodiment of the present invention. The method may be applied to the network architecture shown in FIG. 1. A main difference between this embodiment and the embodiments shown in FIG. 4 and FIG. 5 lies in that, in this embodiment, a resource adjustment policy is to offload a service flow. Details are described below.

Steps 601 to 607 are the same as steps 401 to 407. Details are not described herein again.

Step 609: The orchestration device determines a resource adjustment policy for the registration message based on resource occupation information and the transmission path of the registration message.

In this embodiment, it is assumed that the orchestration device determines, by using the method in step 409, that an infrastructure resource of an NF 4 cannot meet a service flow caused by the burst registration messages, that a transmission bandwidth resource of a link NF 4→NF 5 cannot meet the service flow caused by the burst registration messages either, and that an infrastructure resource of an NF 7 can meet a requirement for processing the burst service flow. Therefore, the NF 7 is selected to share load of service processing of the NF 4. Traffic of the burst registration messages may be guided to the NF 7, or a specific percentage of burst traffic may be guided to the NF 7. This is not limited in this application.

In some embodiments, a service flow processed by the NF 7 may be alternatively sent to the NF 5, which is equivalent to sharing load of the link NF 4→NF 5. Certainly, load of the link NF 4→NF 5 may be alternatively shared by using a method for expanding a capacity of the link NF 4→NF 5.

Step 611: The orchestration device sends a link bandwidth adjustment message to a network management device that manages a link NF 3→NF 7 and a link NF 7→NF 5, so that the network management device allocates resources to the two links, and the network management device receives the message.

The message carries link identifiers of the link NF 3→NF 7 and the link NF 7→NF 5 and information about bandwidth that needs to be allocated to the link NF 3→NF 7 and the link NF 7→NF 5.

For the bandwidth information herein, refer to step 409 in which the orchestration device determines the bandwidth information and sends the bandwidth information to the network management device, or refer to step 511 in which the network management device determines the bandwidth information.

Step 613: The orchestration device sends a message for adjusting a service flow direction to a network function management device that manages the NF 3 and the NF 7, and the network function management device receives the message.

The message requires the NF 3 to change, to the NF 7, a next hop of a specific percentage of service flows that are originally sent to the NF 4 or a service flow with a specific feature in service flows that are originally sent to the NF 4, and requires the NF 7 to set a next hop of this part of traffic to the NF 5.

Step 615: The network function management device sends a configuration message to the NF 3, so that the NF 3 sets a next hop of a specific percentage of service flows or a service flow with a specific feature to the NF 7, and the NF 3 receives the configuration message.

Step 617: The network function management device sends, to the NF 7, a message for setting a next hop, so that the NF 7 sets a next hop of the specific percentage of service flows or the service flow with the specific feature to the NF 5, and the NF 5 receives the message for setting a next hop.

As in FIG. 4, one network management device and one network function management device are shown in FIG. 6. However, in practice, there may be a plurality of network management devices and a plurality of network function management devices.

According to the method provided in this embodiment, a service flow direction is changed, so that a bottleneck point on a transmission path of the service flow is bypassed through load sharing. In this solution, load of one or more NFs can be shared at a time. This solution may also be combined with the solution in FIG. 4 or FIG. 5. For example, some NFs are scaled out, and load of some NFs is shared; or load of some NFs and load of some links are shared, and some NFs and some links are scaled out; or load of an NF is shared, and a link is scaled out.

In the embodiment shown in FIG. 6, actions of the orchestration device may be executed by the orchestration device based on the software module in the memory mentioned above. Actions of the network function management device may be executed by the network function management device based on the software module in the memory mentioned above. Actions of the network management device may be executed by the network management device based on the software module in the memory mentioned above. This is not limited in this embodiment of this application.

The foregoing embodiment is described by using an example in which the NF 4 receives a large quantity of registration messages, and then reports a congestion event to the network function management device. In some implementations, a large quantity of service flow messages (for example, registration messages) may pass through a link, and consequently the link is overloaded. A router may send a link congestion (or overload) event to a network management device that manages the link. Descriptions are provided below with reference to FIG. 7 to FIG. 9.

Figure 7:
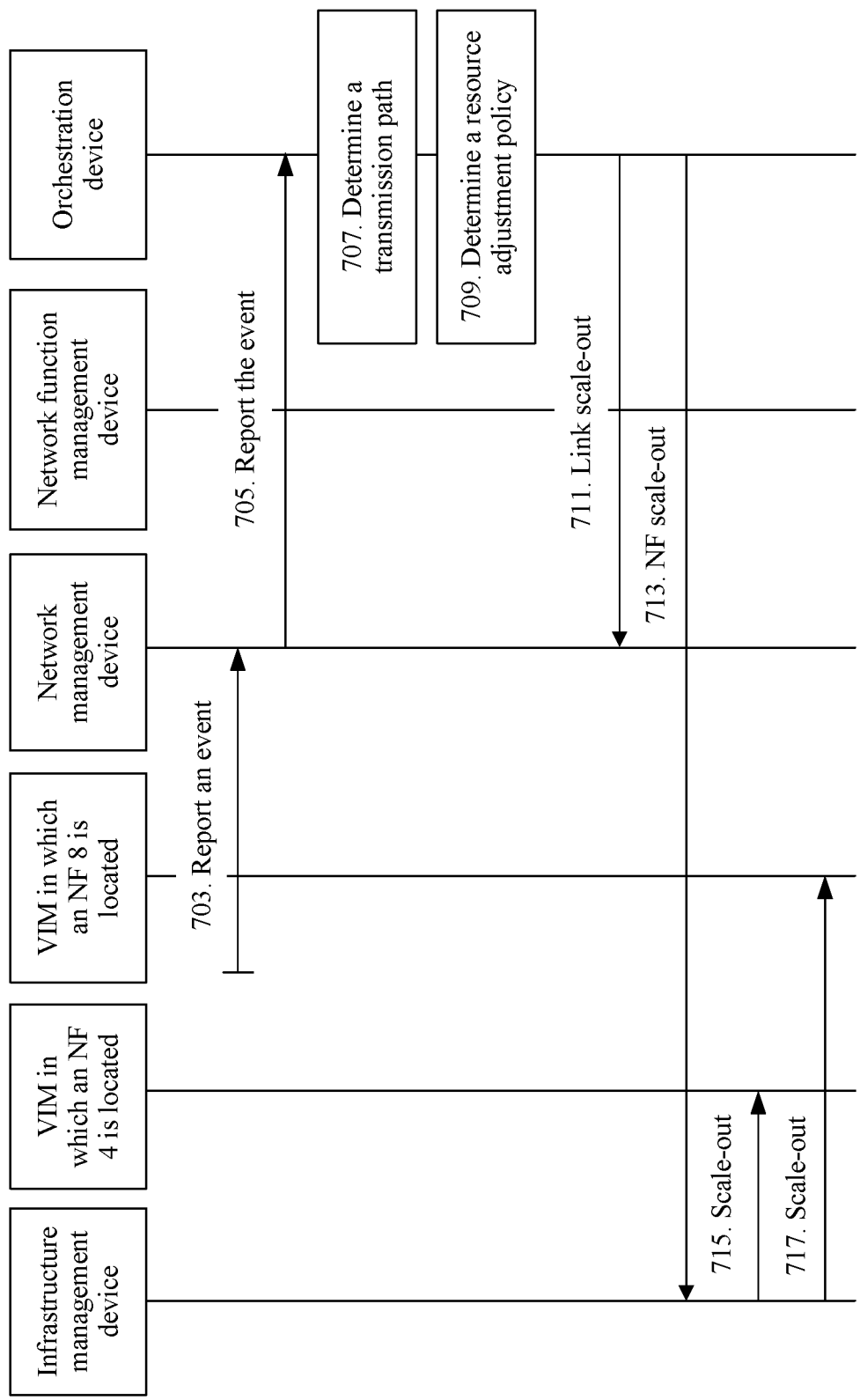
FIG. 7 is a schematic flowchart of another resource adjustment method according to an embodiment of the present invention.

FIG. 7 is a schematic flowchart of a resource adjustment method according to an embodiment of the present invention. The method may be applied to the network architecture shown in FIG. 1.

It is assumed that congestion occurs in a link between an NF 3 and an NF 4 due to a sudden increase in registration messages, and then a router 4 reports the congestion event to a network management device that manages the link (this step is not shown in the figure).

Step 703: The network management device receives the event.

Information carried in the event and several cases in which the network management device performs step 705 are the same as those described in step 403, and details are not described herein again.

Step 705: The network management device reports the congestion event to an orchestration device, and the orchestration device receives the event.

The event carries the foregoing message type and resource occupation information of a burst service flow.

After receiving the reported event in step 703, the network management device may directly send the reported event to the orchestration device, or convert a format of a received message and then send the message to the orchestration device. A specific implementation is not limited in this application.

In one implementation, in an optional solution, the event may further carry scale-out information that is of a link NF 3→NF 4 and that is determined by the network management device. When determining the scale-out information of the link NF 3→NF 4, the orchestration device may choose to use the scale-out information that is of the link NF 3→NF 4 and that is determined by the network management device, may modify the scale-out information that is of the link NF 3→NF 4 and that is determined by the network management device, or may determine the scale-out information of the link NF 3→NF 4.

Steps 707 and 709 are the same as steps 407 and 409.

In step 709, it is assumed that 300 M bandwidth needs to be further increased for the link NF 3→NF 4.

Step 711: Different from step 411, a link scale-out message further carries link identification information and bandwidth requirement information of the link NF 3→NF 4.

Steps 713 to 717 are the same as steps 413 to 417.

According to the method provided in this embodiment, in a scenario in which congestion occurs because the link NF 3→NF 4 receives a large quantity of registration messages, statuses of the NF 4, an NF 5, an NF 8, and links on a transmission path through which the registration message passes may be comprehensively considered, so that not only the link NF 3→NF 4 is scaled out, but also the NF 8, a link between the NF 4 and the NF 5, and a link between the NF 5 and the NF 8 are scaled out. In this way, corresponding scale-out processing is performed for congestion with reference to a status of the entire transmission path, so that resource scale-out efficiency is improved.

In the embodiment shown in FIG. 7, actions of the orchestration device may be executed by the orchestration device based on the software module in the memory mentioned above. Actions of the network function management device may be executed by the network function management device based on the software module in the memory mentioned above. Actions of the network management device may be executed by the network management device based on the software module in the memory mentioned above. This is not limited in this embodiment of this application.

Figure 8:
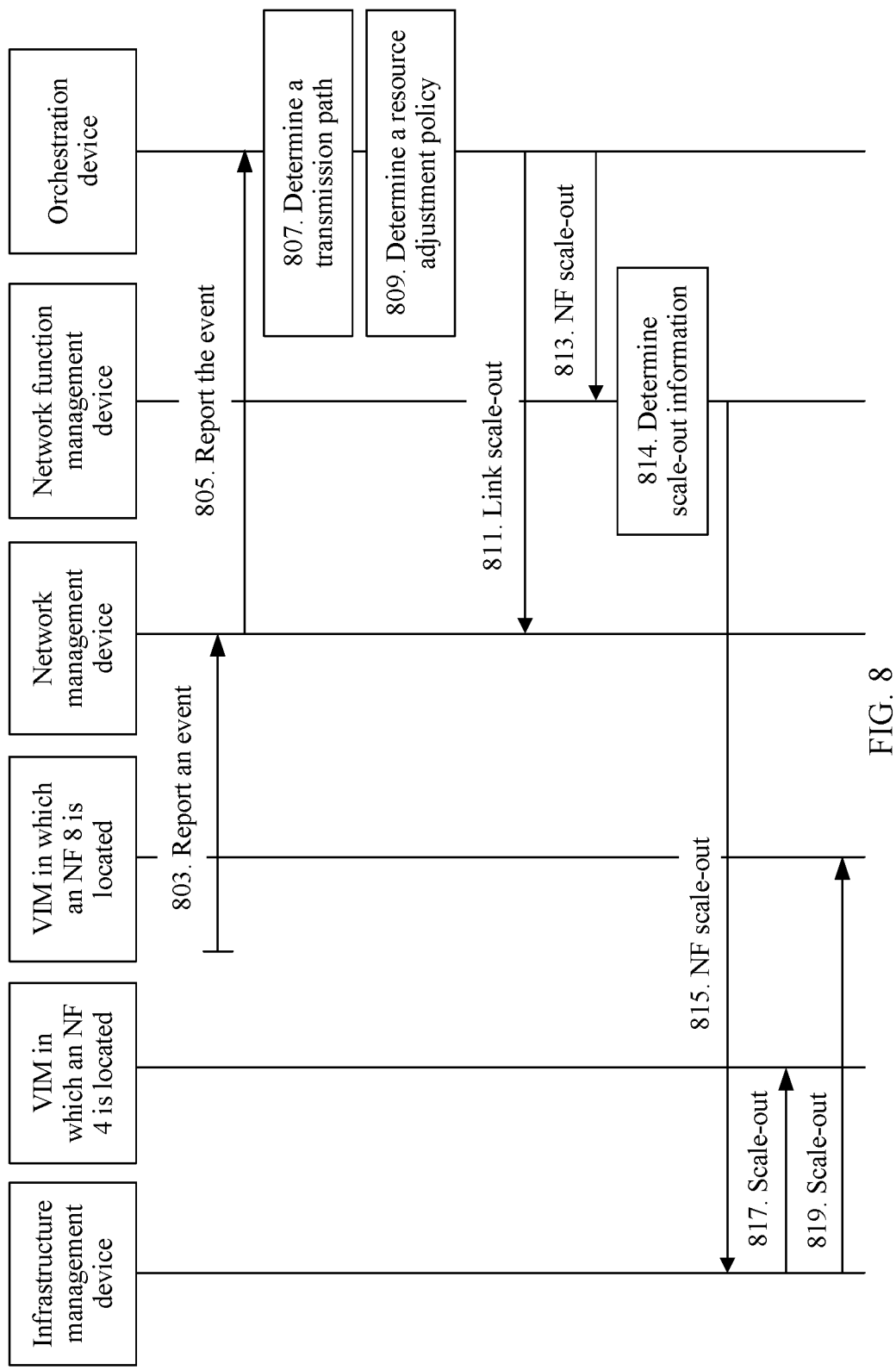
FIG. 8 is a schematic flowchart of another resource adjustment method according to an embodiment of the present invention.

FIG. 8 is a schematic flowchart of a resource adjustment method according to an embodiment of the present invention. The method may be applied to the network architecture shown in FIG. 1. A main difference from the embodiment shown in FIG. 7 lies in that, in this embodiment, an orchestration device determines a to-be-scaled-out object, and another device determines scale-out information of the to-be-scaled-out object. Details are described below.

It is assumed that congestion occurs in a link between an NF 3 and an NF 4 due to a sudden increase in registration messages, and then a router 4 reports the congestion event to a network management device that manages the link (this step is not shown in the figure).

Steps 803 to 809 are the same as steps 703 to 709. Details are not described herein again.

Step 811: Different from step 511, a link scale-out message further carries link identification information and bandwidth requirement information of the link NF 3→NF 4. For a method for determining scale-out information by the network management device, refer to the method for determining the scale-out information by the orchestration device in step 709.

Then, the network management device scales out, based on bandwidth information, a link corresponding to a link identifier.

In specific implementation, alternatively, the orchestration device may first determine bandwidth information of a burst service flow, and then adds identification information of a link that needs to be scaled out and the bandwidth information to link scale-out information.

Steps 813 to 817 are the same as steps 513 to 517.

In the embodiment shown in FIG. 8, actions of the orchestration device may be executed by the orchestration device based on the software module in the memory mentioned above. Actions of the network function management device may be executed by the network function management device based on the software module in the memory mentioned above. Actions of the network management device may be executed by the network management device based on the software module in the memory mentioned above. This is not limited in this embodiment of this application.

In one implementation, there are a plurality of scale-out manners. In FIG. 7 and FIG. 8, scale-out is described by using an example in which both the NF and the link are scaled out. However, in one implementation, it may be figured out that only the link may be scaled-out but the NF is not scaled out, or only the NF may be scaled out but the link is not scaled out. A method for scaling out the NF or the link is similar to the method for scaling out the NF or the link in FIG. 7 or FIG. 8, and details are not described herein again.

Figure 9:
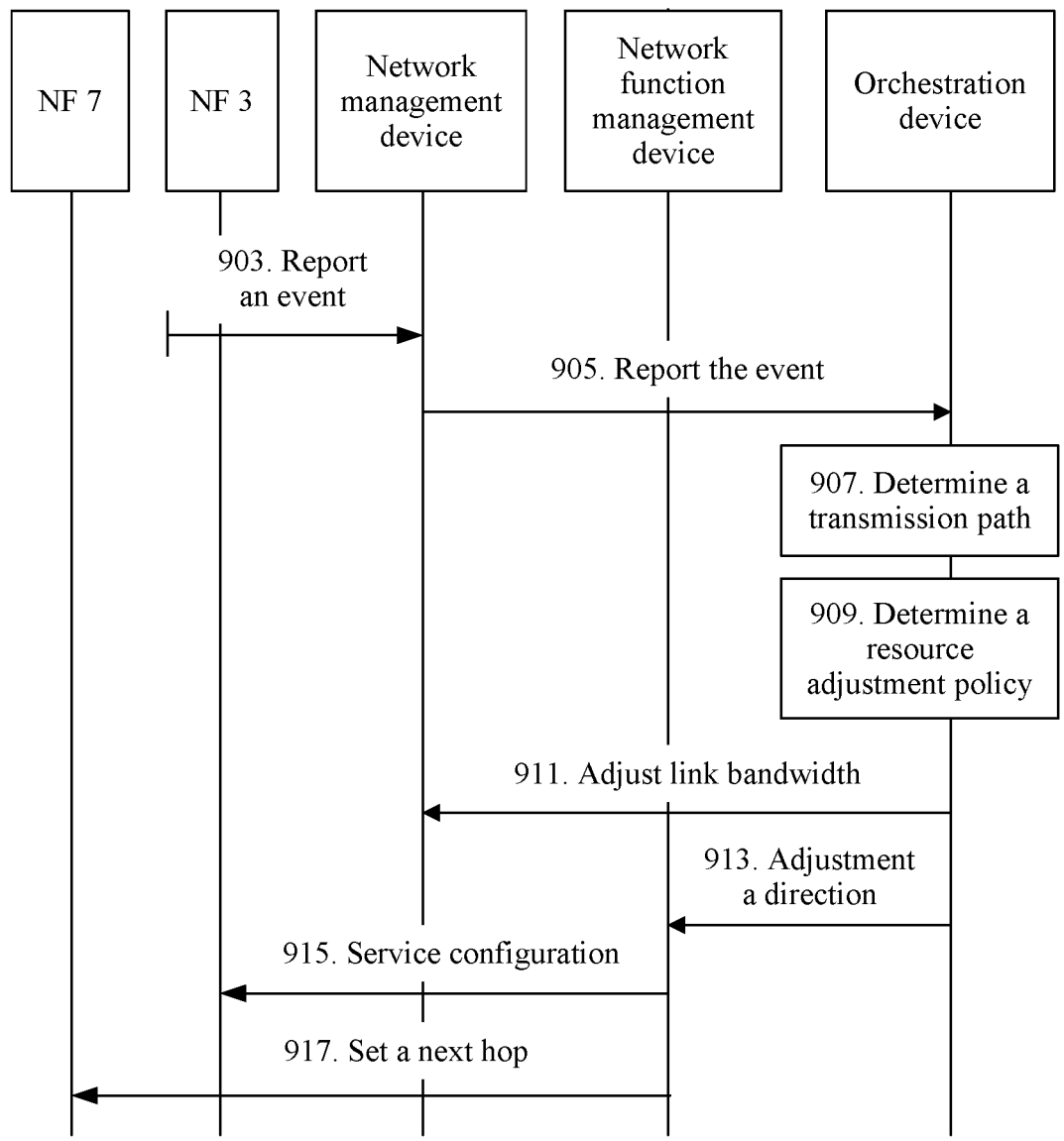
FIG. 9 is a schematic flowchart of a resource adjustment method according to an embodiment of the present invention.

FIG. 9 is a schematic flowchart of a resource adjustment method according to an embodiment of the present invention. The method may be applied to the network architecture shown in FIG. 1. A main difference between this embodiment and the embodiments shown in FIG. 7 and FIG. 8 lies in that, in this embodiment, a resource adjustment policy is to offload a service flow. Details are described below.

It is assumed that congestion occurs in a link between an NF 3 and an NF 4 due to a sudden increase in registration messages, and then a router 1 reports the congestion event to a network management device that manages the link (this step is not shown in the figure).

Steps 903 to 907 are the same as steps 703 to 707. Details are not described herein again.

Step 909: The orchestration device determines a resource adjustment policy for the registration message based on resource occupation information and the transmission path of the registration message.

In this embodiment, it is assumed that the orchestration device determines, by using the method in step 709, that transmission bandwidth resources of the link between the NF 3 and the NF 4 and a link between the NF 4 and an NF 5 cannot meet a service flow caused by the burst registration messages, that an infrastructure resource of the NF 4 cannot meet the service flow caused by the burst registration messages, and that an infrastructure resource of an NF 7 can meet a requirement for processing the burst service flow. Therefore, the NF 7 is selected to share load of service processing of the NF 4. Traffic of the burst registration messages may be guided to the NF 7, or a specific percentage of burst traffic may be guided to the NF 7. This is not limited in this application.

Step 911: Different from step 611, a link bandwidth adjustment message further carries a link identifier of a link NF 3→NF 4 and information about bandwidth that needs to be allocated to the link NF 3→NF 4, in addition to link identifiers of a link NF 3→NF 7 and a link NF 7→NF 5, and information about bandwidth that needs to be allocated to the link NF 3→NF 7 and the link NF 7→NF 5.

Steps 913 to 917 are the same as steps 613 to 617.

According to the method provided in this embodiment, a service flow direction is changed, so that a bottleneck point on a transmission path of the service flow is bypassed through load sharing. In this solution, load of one or more NFs can be shared at a time. This solution may also be combined with the solution in FIG. 7 or FIG. 8. For example, some NFs are scaled out, and load of some NFs is shared; or load of some NFs and load of some links are shared, and some NFs and some links are scaled out; or load of an NF is shared, and a link is scaled out.

In the embodiment shown in FIG. 9, actions of the orchestration device may be executed by the orchestration device based on the software module in the memory mentioned above. Actions of the network function management device may be executed by the network function management device based on the software module in the memory mentioned above. Actions of the network management device may be executed by the network management device based on the software module in the memory mentioned above. This is not limited in this embodiment of this application.

In FIG. 4 to FIG. 9, the orchestration device, the network function management device, the infrastructure management device, and the network management device are separately disposed. In specific implementation, the orchestration device may be alternatively integrated with the network management device. When the orchestration device and the network management device are integrated, functions of the orchestration device and the network management device are implemented by an integrated device. After integration, a person in the art may understand that interaction between the orchestration device and the network management device is not required.

In one implementation, the orchestration device may be alternatively integrated with the network function management device. When the orchestration device and the network function management device are integrated, functions of the orchestration device and the network function management device are implemented by an integrated device. After integration, a person in the art may understand that interaction between the orchestration device and the network function management device is not required.

In one implementation, the orchestration device may be alternatively integrated with the network function management device. When the orchestration device and the network function management device are integrated, functions of the orchestration device and the network function management device are implemented by an integrated device. After integration, a person in the art may understand that interaction between the orchestration device and the network function management device is not required.

In one implementation, the orchestration device may be alternatively integrated with the network function management device. When the orchestration device and the network function management device are integrated, functions of the orchestration device and the network function management device are implemented by an integrated device. After integration, a person in the art may understand that interaction between the orchestration device and the network function management device is not required.

In one implementation, the orchestration device may be alternatively integrated with the infrastructure management device. When the orchestration device and the infrastructure management device are integrated, functions of the orchestration device and the infrastructure management device are implemented by an integrated device. After integration, a person in the art may understand that interaction between the orchestration device and the infrastructure management device is not required.

In one implementation, the correspondence in the foregoing method embodiments may further include, in addition to the correspondence between the characteristic information of the service flow and the transmission path of the service flow, a correspondence between characteristic information of an associated service flow associated with the service flow and a transmission path of the associated service flow.

For example, as described above, when a large quantity of network attachment messages are generated simultaneously, an MME is overloaded. However, after the MME is scaled out, a large quantity of messages (for example, database query messages) for accessing an HSS are generated, and consequently, congestion occurs because the HSS is overloaded. In this case, the network attachment message and the database query message need to be associated. Table 2 is used as an example for description below.

TABLE 3

| Characteristic information of a service flow | Transmission path of the service flow | Characteristic information of an associated service flow | Transmission path of the associated service flow |
| --- | --- | --- | --- |
| Registration | NF 1->NF 3, | Access | NF 4->NF 5 |

TABLE 3-continued

| Characteristic information of a service flow | Transmission path of the service flow | Characteristic information of an associated service flow | Transmission path of the associated service flow |
| --- | --- | --- | --- |
| message | NF 2->NF 3, NF 3->NF 4, NF 4->NF 5, NF 5->NF 8, NF 3->NF 7, NF 7->NF 5 | message | |

As shown in Table 3, after receiving the registration message, the NF 4 may trigger sending of the access message to the NF 5. In this case, if congestion occurs in the NF 4 due to burst registration messages, although the NF 4 is a destination of the registration messages, the registration messages and the access message need to be associated because the registration messages may trigger sending of the access message to the NF 5. For example, when the NF 4 is being scaled out, it is also required to determine whether the NF 5 needs to be scaled out and how many infrastructure resources need to be scaled out, and it is also required to determine whether the link NF 4→NF 5 needs to be scaled out and how many bandwidth resources need to be scaled out.

When there is an associated service flow, in addition to a correspondence between the registration message and a transmission path of the registration message, the correspondence further includes a correspondence between the access message associated with the registration message and a transmission path of the access message. Therefore, in one implementation, in steps 407, 507, 607, 707, 807, and 907, in addition to the transmission path of the registration message, the transmission path of the access message further needs to be determined. Then, in addition to scale-out of an NF or a link on the transmission path of the registration message, it is also required to determine whether an NF or a link on the transmission path of the access message needs to be scaled out, and to determine a required scale-out amount. A determining method is similar to related processing of the registration message in the foregoing method embodiment, and details are not described herein again.

In this embodiment, actions of the orchestration device may be executed by the orchestration device based on the software module in the memory mentioned above. Actions of the network function management device may be executed by the network function management device based on the software module in the memory mentioned above. Actions of the network management device may be executed by the network management device based on the software module in the memory mentioned above. This is not limited in this embodiment of this application.

The solutions provided in the embodiments of the present invention are mainly described from the perspective of interaction between network elements. It may be understood that, to implement the foregoing functions, the foregoing device that implements the orchestration device or the network function management device includes corresponding hardware structures and/or software modules for performing the functions. A person of ordinary skill in the art should easily be aware that, in combination with the example units and algorithms steps described in the embodiments disclosed in this specification, the present invention can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

In the embodiments of the present invention, the orchestration device or the network function management device may be divided into function modules based on the foregoing method examples. For example, each function module may be obtained through division based on each function, or two or more functions may be integrated into one processing module. The integrated module may be implemented in a form of hardware, or may be implemented in a form of a software function module. It should be noted that, in this embodiment of the present invention, unit division is an example, and is merely a logical function division. In actual implementation, another division manner may be used.

Figure 10:
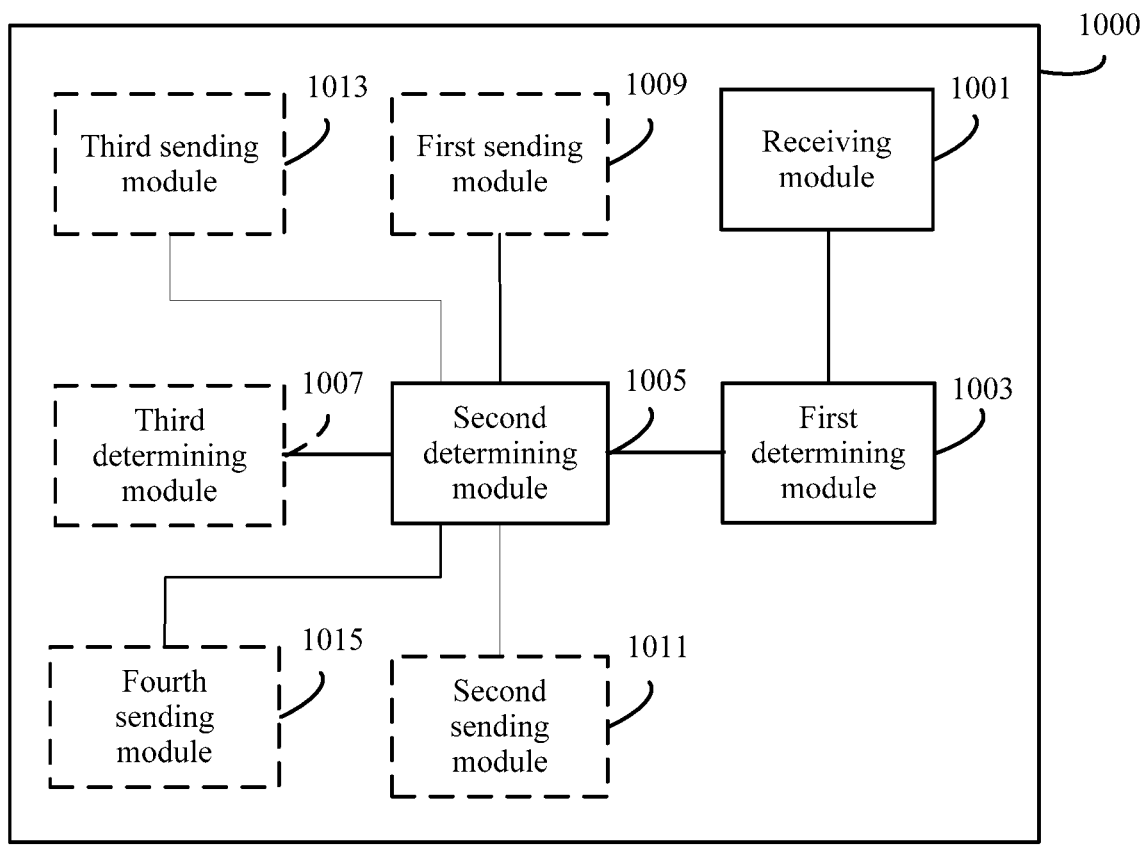
FIG. 10 is a schematic structural diagram of a resource adjustment apparatus according to an embodiment of the present invention.

For example, when each function module is obtained through division based on each corresponding function, FIG. 10 is a possible schematic structural diagram of a resource adjustment apparatus in the foregoing embodiments. The apparatus 1000 includes a receiving module 1001, a first determining module 1003, and a second determining module 1005.

The receiving module 1001 is configured to receive characteristic information of a service flow.

The first determining module 1003 is configured to determine a transmission path of the service flow based on a correspondence between the characteristic information of the service flow and the transmission path of the service flow, where the transmission path includes a start network function NF and an end NF through which the service flow passes, and a link between the start NF and the end NF.

The second determining module 1005 is configured to determine a resource adjustment policy for the transmission path, to adjust a resource required by the service flow.

In an implementation, the second determining module 1005 is configured to determine the resource adjustment policy for the transmission path based on the transmission path and resource occupation information of the service flow.

In another implementation, the second determining module 1005 is specifically configured to: determine, based on the resource occupation information of the service flow, an infrastructure resource required by an NF on the transmission path; and determine, based on the infrastructure resource required by the NF on the transmission path and an idle infrastructure resource of the NF on the transmission path, an NF that needs to be scaled out.

In another possible implementation, the apparatus further includes a third determining module 1007, configured to determine, based on the infrastructure resource required by the NF on the transmission path and the idle infrastructure resource of the NF on the transmission path, scale-out information of the NF that needs to be scaled out.

In possible implementation, the second determining module 1005 is specifically configured to: determine, based on the resource occupation information of the service flow, bandwidth required by a link on the transmission path; and determine, based on the bandwidth required by the link on the transmission path and idle bandwidth of the link on the transmission path, a link that needs to be scaled out.

In another possible implementation, the second determining module 1005 is further configured to determine, based on the bandwidth required by the link on the transmission path and the idle bandwidth of the link on the transmission path, scale-out information of the link that needs to be scaled out.

In possible implementation, in addition to the receiving module 1001, the first determining module 1003, and the second determining module 1005, the apparatus further includes a first sending module 1009, configured to send the characteristic information of the service flow and the resource occupation information of the service flow to an NF management device that manages the NF that needs to be scaled out, so that the NF management device determines scale-out information of the NF that needs to be scaled out. In an optional manner, in addition to the receiving module 1001, the first determining module 1003, and the second determining module 1005, the apparatus further includes a second sending module 1011, configured to send the transmission path and the resource occupation information of the service flow to an NF management device that manages the NF that needs to be scaled out, so that the NF management device determines scale-out information of the NF that needs to be scaled out.

In possible implementation, the apparatus further includes a third sending module 1013, configured to send the characteristic information of the service flow and the resource occupation information of the service flow to a network management device that manages the link that needs to be scaled out, so that the network management device determines scale-out information of the link based on the resource occupation information of the service flow and the idle bandwidth of the link included on the transmission path.

In one implementation, the apparatus further includes a fourth sending module 1015, configured to send the transmission path and the resource occupation information of the service flow to a network management device that manages the link that needs to be scaled out, so that the network management device determines scale-out information of the link based on the resource occupation information of the service flow and the idle bandwidth of the link included on the transmission path.

In one implementation, the characteristic information of the service flow comes from a first network element; and correspondingly, the second determining module 1005 is specifically configured to: determine, based on the transmission path and the resource occupation information of the service flow, an infrastructure resource required by the service flow; and select, based on the infrastructure resource required by the service flow, a second network element that is on the transmission path and that is at a previous hop of the first network element, to offload, to another network element, a part of the service flow sent by the second network element to the first network element.

In one implementation, the correspondence further includes a correspondence between characteristic information of an associated service flow associated with the service flow and a transmission path of the associated service flow. In this case, the first determining module 1003 is further configured to determine the transmission path of the associated service flow based on the characteristic information of the associated service flow and the transmission path of the associated service flow; and the second determining module 1005 is specifically configured to determine the resource adjustment policy based on the resource occupation information, the transmission path of the service flow, and the transmission path of the associated service flow.

The apparatus may be an orchestration device in a communications network, may be a network function management device in a communications network, may be a device on which an orchestration device and a network function management device are integrated, or may be another device in a communications network. All related content of the steps in the foregoing method embodiments may be cited in function descriptions of corresponding function modules, and details are not described herein again.

In this embodiment, the resource adjustment apparatus is presented by obtaining each function module through division based on each corresponding function, or the resource adjustment apparatus is presented by obtaining function modules through division in an integrated manner. The "module" herein may be an application-specific integrated circuit (ASIC), a circuit, a processor and a memory that execute one or more software programs or firmware programs, an integrated logic circuit, and/or another component that can provide the foregoing functions. In a simple embodiment, a person skilled in the art can figure out that the resource adjustment apparatus 1000 may use the form shown in FIG. 3. For example, the receiving module 1001, the first determining module 1003, the second determining module 1005, the third determining module 1007, the first sending module 1009, the second sending module 1011, the third sending module 1013, or the fourth sending module 1015 in FIG. 10 may be implemented by using the processor 31 (and/or the processor 38) and the memory 33 in FIG. 3. Specifically, the receiving module 1001, the first determining module 1003, the second determining module 1005, the third determining module 1007, the first sending module 1009, the second sending module 1011, the third sending module 1013, or the fourth sending module 1015 may be executed by the processor 31 (and/or the processor 38) by invoking the application program code stored in the memory 33. This is not limited in this embodiment of the present invention.

Figure 11:
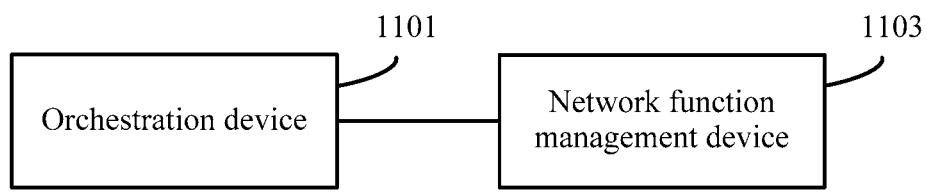
FIG. 11 is a schematic diagram of a resource adjustment system according to an embodiment of the present invention.

FIG. 11 shows a resource adjustment system in the foregoing embodiments. The system includes an orchestration device 1101 and a network function management device 1103.

The orchestration device 1101 is configured to: receive characteristic information of a service flow; determine a transmission path of the service flow based on a correspondence between the characteristic information of the service flow and the transmission path of the service flow, where the transmission path includes a start network function NF and an end NF through which the service flow passes, and a link between the start NF and the end NF; determine, based on resource occupation information of the service flow, an infrastructure resource required by an NF on the transmission path; and determine, based on the infrastructure resource required by the NF on the transmission path and an idle infrastructure resource of the NF on the transmission path, an NF that needs to be scaled out.

The network function management device 1103 is configured to determine scale-out information of the NF that needs to be scaled out.

In one implementation, the orchestration device 1101 is further configured to send the characteristic information of the service flow and the resource occupation information of the service flow to the NF management device 1103 that manages the NF that needs to be scaled out.

In one implementation, the orchestration device 1101 is further configured to send the transmission path and the resource occupation information of the service flow to the NF management device 1103 that manages the NF that needs to be scaled out.

Figure 12:
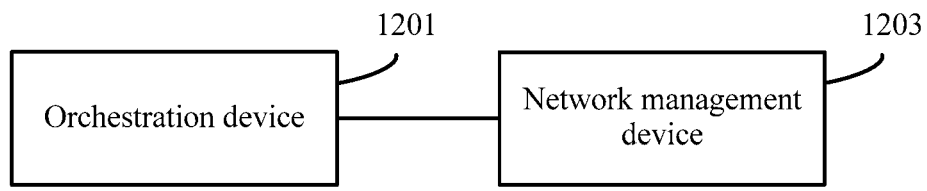
FIG. 12 is a schematic diagram of another resource adjustment system according to an embodiment of the present invention.

FIG. 12 shows a resource adjustment system in the foregoing embodiments. The system includes an orchestration device 1201 and a network management device 1203.

The orchestration device 1201 is configured to: receive characteristic information of a service flow; determine a transmission path of the service flow based on a correspondence between the characteristic information of the service flow and the transmission path of the service flow, where the transmission path includes a start network function NF and an end NF through which the service flow passes, and a link between the start NF and the end NF; and determine, based on the transmission path of the service flow, a network management device that manages a link and that is on the transmission path.

The network management device 1203 is configured to determine scale-out information of the link based on resource occupation information of the service flow and idle bandwidth of the link included on the transmission path.

In one implementation, the orchestration device 1201 is configured to send the characteristic information of the service flow and the resource occupation information of the service flow to the network management device 1203.

In one implementation, the orchestration device 1201 sends the transmission path and the resource occupation information of the service flow to the network management device 1203.

Figure 13:
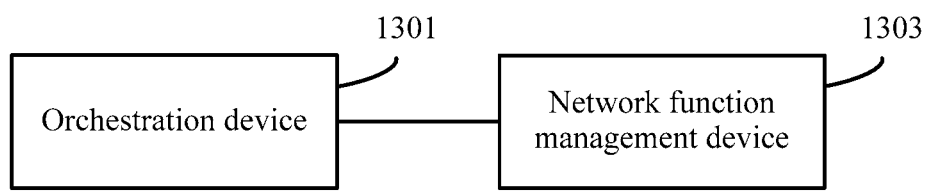
FIG. 13 is a schematic diagram of another resource adjustment system according to an embodiment of the present invention.

FIG. 13 shows a resource adjustment system in the foregoing embodiments. The system includes an orchestration device 1301 and a network function management device 1303.

The orchestration device 1301 is configured to: receive characteristic information of a service flow; determine a transmission path of the service flow based on a correspondence between the characteristic information of the service flow and the transmission path of the service flow, where the transmission path includes a start network function NF and an end NF through which the service flow passes, and a link between the start NF and the end NF; determine, based on the transmission path and resource occupation information of the service flow, an infrastructure resource required by the service flow; select, based on the infrastructure resource required by the service flow, a second network element that is on the transmission path and that is at a previous hop of the first network element; and send a message for adjusting a service flow direction to the network function management device 1303.

The network function management device 1303 is configured to: receive the message for adjusting a service flow direction, and send a configuration message to the second network element, so that the second network element sets a next hop of a specific percentage of service flows or a service flow with a specific feature to a third network element.

In one implementation, the network function management device 1303 is further configured to send, to the third network element, a message for setting a next hop, so that the third network element sets a next hop of the specific percentage of service flows or the service flow with the specific feature to a next-hop network element of the first network element.

All related content of the steps in the foregoing method embodiments may be cited in the devices in the system, and details are not described herein again.

An embodiment of the present invention further provides a computer storage medium, configured to store a computer software instruction used by the resource adjustment apparatuses shown in FIG. 4 to FIG. 9. The computer software instruction includes program code designed for executing the method embodiments. The stored program code is executed, so that a resource can be adjusted by considering statuses of all network resources used for executing a service, thereby improving resource scale-out efficiency.

An embodiment of the present invention further provides a computer program product. The computer program product includes a computer software instruction, and the computer software instruction may be loaded by a processor to implement the methods in the foregoing method embodiments.

Although the present invention is described with reference to the embodiments, in a process of implementing the present invention that claims protection, a person skilled in the art may understand and implement another variation of the disclosed embodiments by viewing the accompanying drawings, disclosed content, and the accompanying claims. In the claims, "comprising" (comprising) does not exclude another component or another step, and "a" or "one" does not exclude a case of "a plurality of". A single processor or another unit may implement several functions enumerated in the claims. Some measures are recorded in dependent claims that are different from each other, but this does not mean that these measures cannot be combined to produce a better effect.

A person skilled in the art should understand that the embodiments of this application may be provided as a method, an apparatus (device), or a computer program product. Therefore, this application may use a form of hardware only embodiments, software only embodiments, or embodiments with a combination of software and hardware. They are collectively referred to as "modules" or "systems". Moreover, this application may use a form of a computer program product that is implemented on one or more computer-usable storage media (including but not limited to a disk memory, a CD-ROM, an optical memory, and the like) that include computer usable program code. The computer program is stored/distributed in a proper medium and is provided as or used as a part of the hardware together with another hardware, or may also use another distribution form, such as by using the Internet or another wired or wireless telecommunications system.

The present invention is described with reference to the flowcharts and/or block diagrams of the method, the apparatus (device), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although the present invention is described with reference to specific features and the embodiments thereof, obviously, various modifications and combinations may be made to them without departing from the spirit and scope of the present invention. Correspondingly, the specification and accompanying drawings are merely examples of descriptions of the present invention defined by the accompanying claims, and is considered as any of or all modifications, variations, combinations or equivalents that cover the scope of the present invention. Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A resource adjustment method, comprising:
   storing, by a communications network, correspondences between different characteristic information regarding different service flows and transmission paths for the different service flows;
   receiving, by the communications network, characteristic information of a service flow;
   determining, by the communications network, based on the stored correspondences, a transmission path of the service flow, wherein the transmission path comprises a start network function (NF) and an end NF through which the service flow passes, and a link between the start NF and the end NF; and
   determining, by the communications network, a resource adjustment policy for the transmission path, to adjust a resource for the service flow.

2. The method according to claim 1, wherein determining, by the communications network, the resource adjustment policy for the transmission path comprises:
   determining, by the communications network, the resource adjustment policy for the transmission path based on the transmission path and resource occupation information of the service flow.

3. The method according to claim 2, wherein determining, by the communications network, the resource adjustment policy for the transmission path based on the transmission path and resource occupation information of the service flow comprises:
   determining, by the communications network based on the resource occupation information of the service flow, an infrastructure resource for an NF on the transmission path; and
   determining, by the communications network based on the infrastructure resource for the NF on the transmission path and an idle infrastructure resource of the NF on the transmission path, an NF to be scaled out.

4. The method according to claim 3, wherein the method further comprises:
    determining, by the communications network based on the infrastructure resource for the NF on the transmission path and the idle infrastructure resource of the NF on the transmission path, scale-out information of the NF that needs to be scaled out.

5. The method according to claim 3, wherein the communications network comprises an orchestration device, and the method further comprises:
    sending, by the orchestration device, the characteristic information of the service flow and the resource occupation information of the service flow to an NF management device that manages the NF to be scaled out to facilitate the NF management device to determine scale-out information of the NF that needs to be scaled out.

6. The method according to claim 3, wherein the communications network comprises an orchestration device, and the method further comprises:
    sending, by the orchestration device, the transmission path and the resource occupation information of the service flow to an NF management device that manages the NF to be scaled out to facilitate the NF management device to determine scale-out information of the NF that needs to be scaled out.

7. The method according to claim 2, wherein determining, by the communications network, the resource adjustment policy for the transmission path based on the transmission path and resource occupation information of the service flow comprises:
    determining, by the communications network based on the resource occupation information of the service flow, bandwidth required by a link on the transmission path; and
    determining, by the communications network based on the bandwidth for the link on the transmission path and idle bandwidth of the link on the transmission path, a link to be scaled out.

8. The method according to claim 7, wherein the method further comprises:
    determining, by the communications network based on the bandwidth for the link on the transmission path and the idle bandwidth of the link on the transmission path, scale-out information of the link to be scaled out.

9. The method according to claim 7, wherein the communications network comprises an orchestration device, and the method further comprises:
    sending, by the orchestration device, the characteristic information of the service flow and the resource occupation information of the service flow to a network management device that manages the link to be scaled out to facilitate the network management device to determine scale-out information of the link based on the resource occupation information of the service flow and the idle bandwidth of the link comprised on the transmission path.

10. The method according to claim 7, wherein the communications network comprises an orchestration device, and the method further comprises:
    sending, by the orchestration device, the transmission path and the resource occupation information of the service flow to a network management device that manages the link to be scaled out to facilitate the network management device to determine scale-out information of the link based on the resource occupation information of the service flow and the idle bandwidth of the link on the transmission path.

11. The method according to claim 1, wherein the characteristic information of the service flow comes from a first network element; and
    determining, by the communications network, based on the stored correspondences, the resource adjustment policy for the transmission path specifically comprises:
    determining, by the communications network based on the transmission path and the resource occupation information of the service flow, an infrastructure resource for the service flow; and
    selecting, by the communications network based on the infrastructure resource for the service flow, a second network element that is on the transmission path and that is at a previous hop of the first network element, to offload, to another network element, a part of the service flow sent by the second network element to the first network element.

12. The method according to claim 1, wherein the stored correspondences comprises a correspondence between characteristic information of an associated service flow associated with the service flow and a transmission path of the associated service flow;
    the method further comprises: determining, by the communications network, the transmission path of the associated service flow based on the characteristic information of the associated service flow and the transmission path of the associated service flow; and, wherein
    determining, by the communications network, the resource adjustment policy for the transmission path comprises:
    determining, by the communications network, the resource adjustment policy based on the resource occupation information, the transmission path of the service flow, and the transmission path of the associated service flow.

13. A resource adjustment apparatus, comprising at least one processor, and a computer readable medium having a plurality of computer readable instructions stored thereon that, when executed by the at least one processor, cause the resource adjustment apparatus to:
    store correspondences between different characteristic information regarding different service flows and transmission paths for the different service flows;
    receive characteristic information of a service flow;
    determine a transmission path of the service flow based on the stored correspondences, wherein the transmission path comprises a start network function NF and an end NF through which the service flow passes, and a link between the start NF and the end NF; and
    determine a resource adjustment policy for the transmission path, to adjust a resource required by the service flow.

14. The apparatus according to claim 13, wherein the computer readable instructions when executed by the at least one processor, cause the resource adjustment apparatus to: determine the resource adjustment policy for the transmission path based on the transmission path and resource occupation information of the service flow.

15. The apparatus according to claim 14, wherein the computer readable instructions when executed by the at least one processor, cause the resource adjustment apparatus to: determine, based on the resource occupation information of the service flow, an infrastructure resource for an NF on the transmission path; and determine, based on the infrastructure resource required by the NF on the transmission path and an idle infrastructure resource of the NF on the transmission path, an NF to be scaled out.

16. The apparatus according to claim 14, wherein the computer readable instructions when executed by the at least one processor, cause the resource adjustment apparatus to:
determine, based on the resource occupation information of the service flow, a bandwidth for a link on the transmission path; and
determine, based on the bandwidth required by the link on the transmission path and idle bandwidth of the link on the transmission path, a link to be scaled out.

17. The apparatus according to claim 16, wherein the computer readable instructions when executed by the at least one processor, cause the resource adjustment apparatus to: send the characteristic information of the service flow and the resource occupation information of the service flow to a network management device that manages the link to be scaled out to facilitate the network management device to determine scale-out information of the link based on the resource occupation information of the service flow and the idle bandwidth of the link comprised on the transmission path.

18. The apparatus according to claim 16, wherein the computer readable instructions when executed by the at least one processor, cause the resource adjustment apparatus to: send the transmission path and the resource occupation information of the service flow to a network management device that manages the link to be scaled out to facilitate the network management device to determine scale-out information of the link based on the resource occupation information of the service flow and the idle bandwidth of the link on the transmission path of the service flow.

19. The apparatus according to claim 13, wherein the computer readable instructions when executed by the at least one processor, cause the resource adjustment apparatus to:
determine, based on the transmission path and the resource occupation information of the service flow, an infrastructure resource required by the service flow; and
select, based on the infrastructure resource required by the service flow, a second network element that is on the transmission path and that is at a previous hop of the first network element, to offload, to another network element, a part of the service flow sent by the second network element to the first network element.

20. The apparatus according to claim 13, wherein the correspondence further comprises a correspondence between characteristic information of an associated service flow associated with the service flow and a transmission path of the associated service flow; and
wherein the computer readable instructions when executed by the at least one processor, cause the resource adjustment apparatus to: determine the transmission path of the associated service flow based on the characteristic information of the associated service flow and the transmission path of the associated service flow; and the at least one processor is configured to determine the resource adjustment policy based on the resource occupation information, the transmission path of the service flow, and the transmission path of the associated service flow.

* * * * *